US012757192B2

(12) United States Patent
Nishio et al.

(10) Patent No.: US 12,757,192 B2
(45) Date of Patent: Oct. 6, 2026

(54) TERMINAL, BASE STATION, TRANSMITTING METHOD, AND RECEIVING METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Pansonic Intellectual Property Corporation of America, Torrance, CA (US)

( * ) Notice: Subject to any disclaimer, the term of this patent is extended or adjusted under 35 U.S.C. 154(b) by 456 days.

(21) Appl. No.: 18/249,364

(22) PCT Filed: Jul. 13, 2021

(86) PCT No.: PCT/JP2021/026259
§ 371 (c)(1),
(2) Date: Apr. 17, 2023

(87) PCT Pub. No.: WO2022/085252
PCT Pub. Date: Apr. 28, 2022

(65) Prior Publication Data
US 2023/0397196 A1 Dec. 7, 2023

(30) Foreign Application Priority Data
Oct. 22, 2020 (JP) ................................ 2020-177279

(51) Int. Cl.
*H04W 72/1268* (2023.01)
*H04W 56/00* (2009.01)
(Continued)

(52) U.S. Cl.
CPC ... *H04W 72/1268* (2013.01); *H04W 56/0045* (2013.01); *H04W 72/232* (2023.01); *H04W 84/06* (2013.01)

(58) Field of Classification Search
CPC ......... H04W 72/1268; H04W 56/0045; H04W 72/23; H04W 84/06; H04W 56/005;
(Continued)

(56) References Cited

U.S. PATENT DOCUMENTS

2016/0323852 A1 11/2016 Golitschek Edler Von Elbwart et al.
2019/0159149 A1 5/2019 Ryu et al.
(Continued)

FOREIGN PATENT DOCUMENTS

CN 111316735 A 6/2020

OTHER PUBLICATIONS

Extended European Search Report dated Feb. 13, 2024, for the corresponding European Patent Application No. 21882393.8, 9 pages.
(Continued)

*Primary Examiner* — Shah M Rahman
(74) *Attorney, Agent, or Firm* — Seed Intellectual Property Law Group LLP

(57) ABSTRACT

This terminal is provided with: a control circuit which controls uplink transmission timing using either a first offset or a second offset shorter than the first offset, on the basis of information relating to a control signal for scheduling; and a transmitting circuit which performs uplink transmission on the basis of the uplink transmission timing control.

12 Claims, 15 Drawing Sheets

(51) Int. Cl.
*H04W 72/232* (2023.01)
*H04W 84/06* (2009.01)

(58) Field of Classification Search
CPC ... H04W 72/11; H04W 72/232; H04L 5/0053; H04L 5/0094
See application file for complete search history.

(56) References Cited

U.S. PATENT DOCUMENTS

| | | | | |
|---|---|---|---|---|
| 2020/0245317 | A1 | 7/2020 | Hwang et al. | |
| 2021/0105731 | A1* | 4/2021 | Lin | H04W 72/23 |
| 2021/0105761 | A1* | 4/2021 | Cheng | H04L 5/0053 |
| 2021/0227481 | A1* | 7/2021 | Xu | H04W 56/005 |
| 2021/0314892 | A1* | 10/2021 | Rico Alvarino | H04W 72/0446 |
| 2022/0095258 | A1* | 3/2022 | Yeo | H04W 56/0045 |
| 2022/0240283 | A1* | 7/2022 | Hong | H04L 1/1896 |
| 2022/0287048 | A1* | 9/2022 | Lin | H04L 27/2655 |
| 2022/0322265 | A1* | 10/2022 | Dai | H04W 56/0045 |
| 2022/0394671 | A1* | 12/2022 | Zhang | H04B 7/0617 |
| 2023/0189088 | A1* | 6/2023 | Shin | H04B 7/18513 455/427 |
| 2023/0254795 | A1* | 8/2023 | Ryu | H04W 72/21 370/350 |
| 2023/0291504 | A1* | 9/2023 | Cheng | H04L 1/1896 |
| 2023/0397247 | A1* | 12/2023 | Jung | H04B 7/18519 |
| 2025/0126584 | A1* | 4/2025 | Rico Alvarino | H04L 27/2646 |

OTHER PUBLICATIONS

Nokia et al., "Doppler Compensation, Uplink Timing Advance and Random Access in NTN," R1-1913017, Agenda Item: 7.2.5.3, 3GPP TSG RAN WG1 #99, Reno, USA, Nov. 18-22, 2019. (28 pages).
3GPP TR 38.821 V16.0.0, "3rd Generation Partnership Project; Technical Specification Group Radio Access Network; Solutions for NR to support non-terrestrial networks (NTN) (Release 16)," Dec. 2019. (140 pages).
3GPP TR 38.913 V16.0.0, "3rd Generation Partnership Project; Technical Specification Group Radio Access Network; Study on Scenarios and Requirements for Next Generation Access Technologies; (Release 16)," Jul. 2020. (40 pages).
3GPP TS 23.501 V16.1.0, "3rd Generation Partnership Project; Technical Specification Group Services and System Aspects; System Architecture for the 5G System; Stage 2 (Release 16)," Jun. 2019. (368 pages).
3GPP TS 38.211 V15.6.0, "3rd Generation Partnership Project; Technical Specification Group Radio Access Network; NR; Physical channels and modulation (Release 15)," Jun. 2019. (97 pages).
3GPP TS 38.211 V15.8.0, "3rd Generation Partnership Project; Technical Specification Group Radio Access Network; NR; Physical channels and modulation (Release 15)," Dec. 2019. (97 pages).
3GPP TS 38.300 V15.6.0, "3rd Generation Partnership Project; Technical Specification Group Radio Access Network; NR; NR and NG-RAN Overall Description; Stage 2 (Release 15)," Jun. 2019. (99 pages).
3GPP TS 38.321 V15.8.0, "3rd Generation Partnership Project; Technical Specification Group Radio Access Network; NR; Medium Access Control (MAC) protocol specification (Release 15)," Dec. 2019. (78 pages).
3GPP TS 38.321 V16.2.0, "3rd Generation Partnership Project; Technical Specification Group Radio Access Network; NR; Medium Access Control (MAC) protocol specification (Release 16)," Sep. 2020. (154 pages).
Caict, "Timing relationship enhancements to support NTN," R1-2006855, Agenda Item: 8.4.1, 3GPP TSG RAN WG1 Meeting #102-e, e-Meeting, Aug. 17-28, 2020. (5 pages).
Intel Corporation, "Discussion on TA and PRACH for NTN," R1-1908643, Agenda item: 7.2.5.3, 3GPP TSG RAN WG1 #98, Prague, Czech Republic, Aug. 26-30, 2019. (4 pages).
International Search Report, mailed Aug. 31, 2021, for International Patent Application No. PCT/JP2021/026259. (5 pages) (with English Translation).
International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).
Panasonic, "Timing relationship enhancement for NTN," R1-2006325, Agenda Item: 8.4.1, 3GPP TSG RAN WG1 #102e, E-meeting, Aug. 17-28, 2020. (4 pages).
Qualcomm Incorporated, "Enhancements on Timing Relationship for NTN," R1-2006804, Agenda item: 8.4.1, 3GPP TSG RAN WG1 #102-e, e-Meeting, Aug. 17-20, 2020. (4 pages).
Sony, "Enhancements on delay-tolerant HARQ," R1-2005575, Agenda Item: 8.4.3, 3GPP TSG RAN WG1 Meeting #102-e, E-meeting, Aug. 17-28, 2020. (5 pages).

* cited by examiner

TERMINAL, BASE STATION, TRANSMITTING METHOD, AND RECEIVING METHOD

TECHNICAL FIELD

The present disclosure relates to a terminal, a base station, a transmission method, and a reception method.

BACKGROUND ART

In the standardization of 5G, New Radio access technology (NR) was discussed in 3GPP, and specification of Release 15 (Rel. 15) of NR was published.

CITATION LIST

Non-Patent Literature

NPL 1
3GPP, TR 38.821, V16.0.0 “Solutions for NR to support non-terrestrial networks (NTN) (Release 16)”, 2019-12
NPL 2
3GPP, TS 38.321, V16.2.0 “Medium Access Control (MAC) protocol specification (Release 15)”, 2020-09

SUMMARY OF INVENTION

There is scope for further study, however, on appropriate timing control in accordance with a propagation delay between a terminal and a base station.

One non-limiting and exemplary embodiment of the present disclosure facilitates providing a terminal, a base station, a transmission method, and a reception method each capable of realizing appropriate timing control in accordance with a propagation delay between a terminal and a base station.

A terminal according to an embodiment of the present disclosure includes: control circuitry, which, in operation, performs control of an uplink transmission timing by using either a first offset or a second offset that is shorter than the first offset, based on information on a control signal for scheduling; and transmission circuitry, which, in operation, performs uplink transmission based on the control of the uplink transmission timing.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one exemplary embodiment of the present disclosure, it is possible to realize appropriate timing control in accordance with a propagation delay between a terminal and a base station.

Additional benefits and advantages of one aspect of the present disclosure will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the drawings.

[Extension to Non-Terrestrial Network (NTN)]

Release 15 (Rel.15) of a New Radio access technology (NR) has been specified as a radio access technology for terrestrial networks. Meanwhile, an extension of NR to Non-Terrestrial Network (NTN) such as communication using a satellite and/or a High-altitude platform station (HAPS) has been studied (e.g., NPL 1). In the NTN environment, a terminal and a base station perform radio communication via a satellite, for example. Hereinafter, a radio link between a terminal and a satellite may be referred to as a “service link”, and a radio link between a satellite and a base station may be referred to as a “feeder link”.

In the NTN environment, a coverage area of a satellite (e.g., one or more cells) for a terminal on the ground or a terminal on an airplane is formed by a beam from the satellite. Further, a round-trip time of radio wave propagation between the terminal and the satellite is determined by the altitude of the satellite (e.g., approximately up to 36000 km) and/or the angle when seen from the terminal, that is, the positional relation between the satellite and the terminal. In addition, when the base station is placed on the ground GW (Gateway), a round-trip time of radio wave propagation between the base station and the terminal is obtained by adding a round-trip time of radio wave propagation between the satellite and the ground GW to the round-trip time of radio wave propagation between the terminal and the satellite.

For example, NPL 1 describes that the Round Trip Time (RTT) of radio wave propagation between the base station and the terminal takes up to approximately 540 ms in NTN. NPL 1 also describes that the maximum differential delay of approximately 10 ms occurs depending on the location of the terminal in a beam (in a cell). The maximum differential delay indicates, for example, a difference, within a beam (within a cell), between a round-trip time between the terminal at a position farthest from the satellite and the satellite and a round-trip time between the terminal at a position closest to the satellite and the satellite.

[Random Access Procedure]

In 5G NR, the terminal performs transmission using a random access channel for an initial access, a data transmission request, and the like. For example, the random access procedure is performed with a 4-step random access (also referred to as a 4-step Random Access Channel (RACH) or a 4-step Contention Based Random Access (Step CBRA)).

Figure 1:
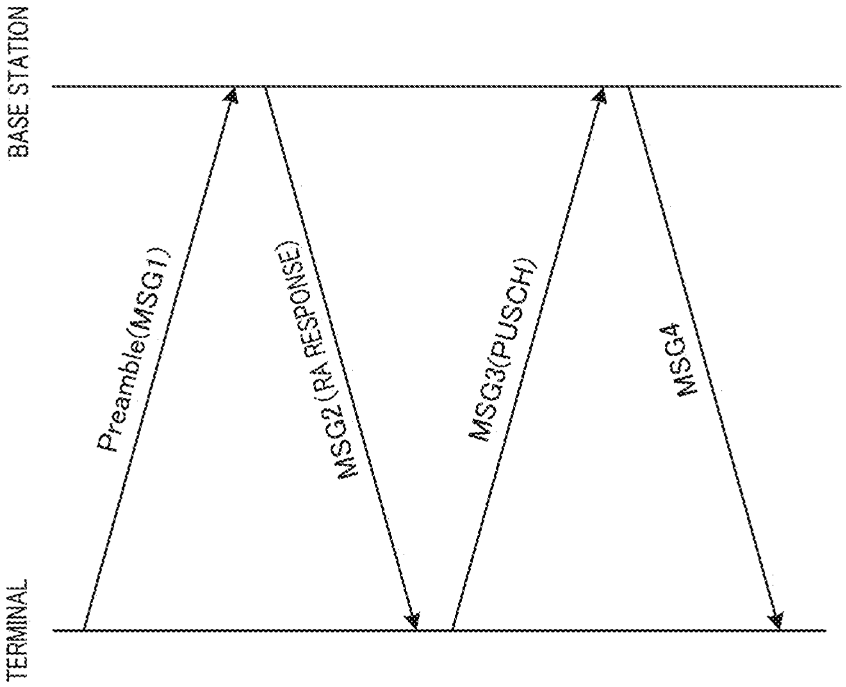
FIG. 1 illustrates an exemplary 4-step random access procedure.

FIG. 1 illustrates an exemplary 4-step random access procedure. In the 4-step random access, for example, as illustrated in FIG. 1, the terminal (UE: User Equipment) transmits a Preamble signal of a Physical Random Access Channel (PRACH) to the base station (gNB) in the first-step transmission (MSG1). The MSG1 transmission in the terminal is performed at transmission timing (slot timing or RACH Occasion) indicated to each cell from the base station. In the following description, transmitting a signal of PRACH (e.g., a Preamble signal) may be abbreviated as "PRACH transmission" or "transmit PRACH". Further, in the following description, receiving a signal of PRACH may be described as "PRACH reception" or "receive PRACH". Note that transmission and reception of a signal of another channel may be similarly abbreviated.

The base station receives and decodes MSG1, and indicates an RA response (Random Access response (RAR)) to the Preamble signal of PRACH, scheduling information including an uplink transmission timing of MSG3, and the like to the terminal in the second-step transmission (MSG2).

The terminal receives and decodes MSG2, and indicates information for establishing a Connection such as information on the terminal (e.g., terminal ID or the like) and the like to the base station in the third-step transmission (MSG3) by using the scheduling information indicated in MSG2. MSG3 is indicated in a Physical Uplink Shared Channel (PUSCH), for example. The information indicated by MSG3 may be referred to as Radio Resource Control (RRC) connection-request information.

The base station receives and decodes MSG3, and indicates a Connection establishment response and the like in the fourth-step transmission (MSG4).

[Timing Adjustment]

In 5G NR, the transmission timing of the terminal is controlled so that signals from different terminals in the cell are confined within a certain period of time in the base station. For example, the term "within a certain period of time" means within Cyclic Prefix (CP) of an Orthogonal Frequency Division Multiplexing (OFDM) signal or a Discrete Fourier Transform-Spread-OFDM (DFT-S-OFDM) signal.

In the random access procedure, the transmission of MSG1 by the terminal is performed at transmission timing (RACH Occasion) indicated from the base station for each cell. In this case, the terminal determines the transmission timing based on the reception timing of a synchronization signal called SSB (SS (Synchronization Signal)/PBCH (Physical Broadcast channel) Block) transmitted from the base station in the downlink. Therefore, the reception timing at the base station is shifted from the reception timing assumed in the base station depending on the propagation delay between the base station and the terminal. In this case, the reception timing assumed in the base station is, for example, a reception timing determined based on the transmission timing (RACH Occasion) indicated by the base station for each cell.

Then, the base station transmits information for correcting (adjusting) the timing to the terminal in MSG2. The information for correcting (adjusting) the timing may be referred to as a TA (Timing Advance) command (e.g., NPL 2). The terminal corrects the transmission timing for MSG3 and after MSG3 based on the TA command included in MSG2. Further, the base station transmits a TA command to the terminal when a shift in reception timing is detected at the transmission and reception of a signal for MSG3 and after MSG3.

In NTN, because the communication between the base station and the terminal is long-distance communication, the propagation delay between the base station and the terminal is large, and the difference in a propagation delay between terminals is large, compared to the terrestrial cellular system. The difference in a propagation delay between terminals corresponds to, for example, a difference between a propagation delay between certain base station A and certain terminal a and a propagation delay between base station A and terminal b that is different from terminal a.

Therefore, the reception timings of PRACHs transmitted from different terminals are significantly different from one another in the base station, which makes reception in the base station complicated. Further, there may be a case where the propagation delay occurred in the NTN environment cannot be corrected by a TA command defined in Rel.15. Furthermore, when the range of TA command is extended to correct a large propagation delay, the information amount (e.g., the number of bits) required for indicating the TA command increases.

Thus, it has been discussed that the terminal calculates the propagation delay based on the distance between the terminal and the satellite estimated by using the position information on the terminal obtained by the Global Navigation Satellite System (GNSS) or the like and the position information on the satellite obtained from the orbital information (satellite ephemeris) of the satellite, and the terminal autonomously adjusts the timing.

Figure 2:
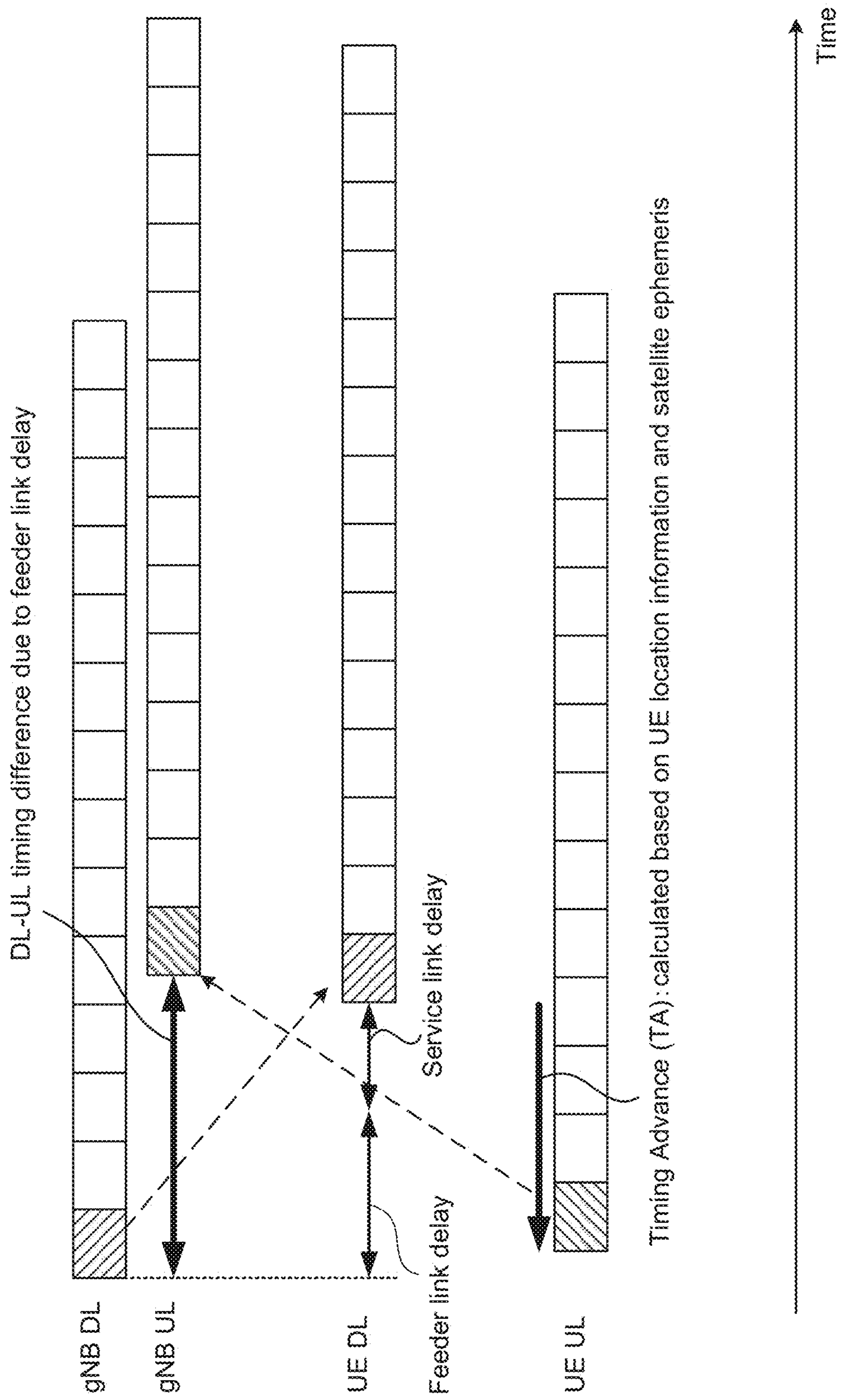
FIG. 2 illustrates an exemplary timing adjustment based on position information on a terminal and orbital information on a satellite.

FIG. 2 illustrates an exemplary timing adjustment based on the position information on the terminal (UE location information) and orbital information on a satellite (satellite ephemeris).

FIG. 2 exemplarily illustrates a downlink (DL) transmission slot and an uplink (UL) reception slot of the base station (gNB), and a DL reception slot and a UL transmission slot of the terminal (UE). Note that the horizontal axis in FIG. 2 represents a time axis.

FIG. 2 illustrates that a propagation delay from transmission timing of a certain signal in the base station to reception timing of the signal in the terminal is represented by a Feeder link delay and a Service link delay. In addition, FIG. 2 illustrates that the terminal adjusts the transmission timing of the signal using TA determined based on the position information on the terminal and the orbital information on the satellite. The TA in FIG. 2 corresponds to, for example, twice the propagation delay of the service link.

However, even though the delay between the terminal and the satellite (that is, the service link) is corrected by the timing adjustment in the terminal based on the distance between the satellite and the terminal, the delay between the base station located on the ground GW (Gateway) and the satellite (that is, feeder link) is not corrected. Further, when the satellite and the terminal are in a Non Line-of-Sight (NLOS) environment, the propagation delay calculated by using the position information may be different from the actual propagation delay including the reflection and/or diffraction occurred in the NLOS environment.

Further, in 5G NR, transmission-slot timing is defined in Rel.15.

Figure 3:
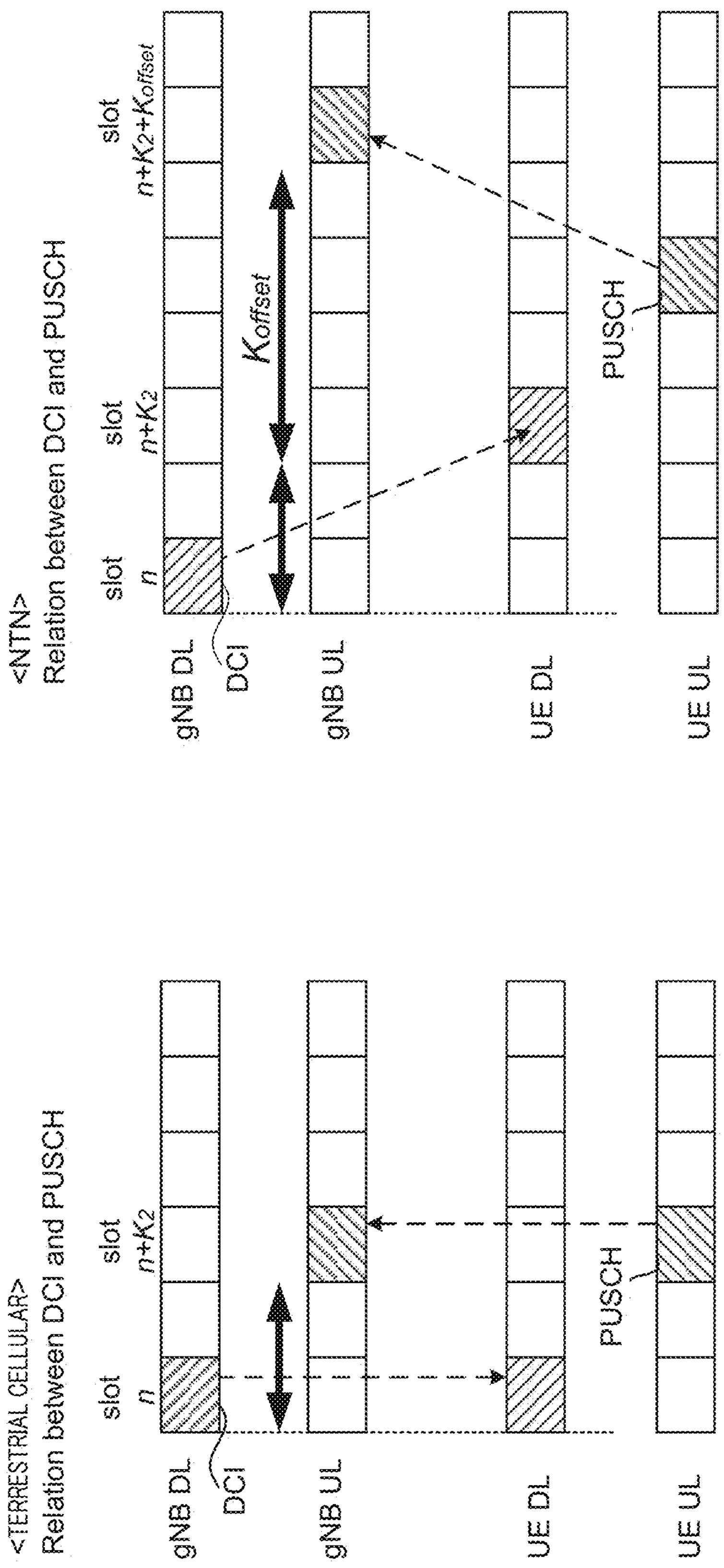
FIG. 3 illustrates exemplary transmission-slot timing.

FIG. 3 illustrates exemplary transmission-slot timing. FIG. 3 illustrates exemplary transmission-slot timing in the terrestrial cellular defined in Rel.15 and exemplary transmission-slot timing studied for NTN.

FIG. 3 exemplarily illustrates a DL transmission slot and a UL reception slot of the base station (gNB), and a DL reception slot and a UL transmission slot of the terminal (UE). Note that the horizontal axis in FIG. 3 represents a time axis.

In FIG. 3, in the definition of the transmission-slot timing in Rel. 15, a signal including Downlink Control Information (DCI) is transmitted from the base station to the terminal in the nth slot, and a signal of PUSCH is transmitted from the terminal to the base station in the n+$K_2$th slot.

As illustrated in FIG. 3, it has been discussed for NTN to provide an offset $K_{offset,cell}$ (sometimes abbreviated as $K_{offset}$) for correcting a propagation delay longer than that of the terrestrial cellular to the definition of the transmission-slot timing in Rel.15. For example, $K_{offset}$ is broadcast for each cell.

On the other hand, because the round-trip propagation delay (RTT) between the terminal and the satellite varies depending on the location of the terminal in the cell, some terminals may miss the transmission or wait for transmission for a long time even when the offset for correcting a propagation delay longer than that of the terrestrial cellular is provided.

In addition, it is not sufficiently discussed on considering both timing control using TA and transmission-slot control.

Then, for example, one non-limiting embodiment of the present disclosure realizes an appropriate timing control in accordance with a propagation delay between the terminal and the base station in consideration of both the timing control using TA and transmission-slot control in an environment where the propagation delay between the terminal and the base station increases, such as an NTN environment.

Embodiment 1

[Overview of Communication System]

A communication system according to the embodiment of the present disclosure includes terminal 100 (corresponding to a transmission apparatus) and base station 200 (corresponding to a reception apparatus).

Figure 4:
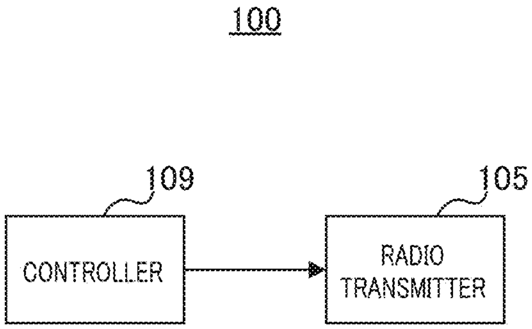
FIG. 4 is a block diagram illustrating an exemplary configuration of a part of the terminal.

FIG. 4 is a block diagram illustrating an exemplary configuration of a part of terminal 100. In terminal 100 illustrated in FIG. 4, controller 109 controls transmission timing based on the first information on the control of transmission timing of a signal in transmission units of the signal and the second information on the control of transmission timing in units finer than the transmission units. Radio transmitter 105 performs signal transmission based on the control of the transmission timing by controller 109.

Figure 5:
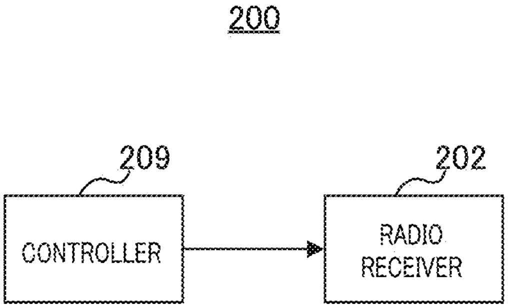
FIG. 5 is a block diagram illustrating an exemplary configuration of a part of a base station.

FIG. 5 is a block diagram illustrating an exemplary configuration of a part of base station 200. In base station 200 illustrated in FIG. 5, controller 209 controls the reception timing based on the first information on the control of reception timing of a signal in reception units of the signal and the second information on the control of transmission timing in units finer than the reception units. Radio receiver 202 performs signal reception based on the control of the reception timing by controller 209.

[Configuration of Terminal]

Next, an exemplary configuration of terminal 100 will be described.

Figure 6:
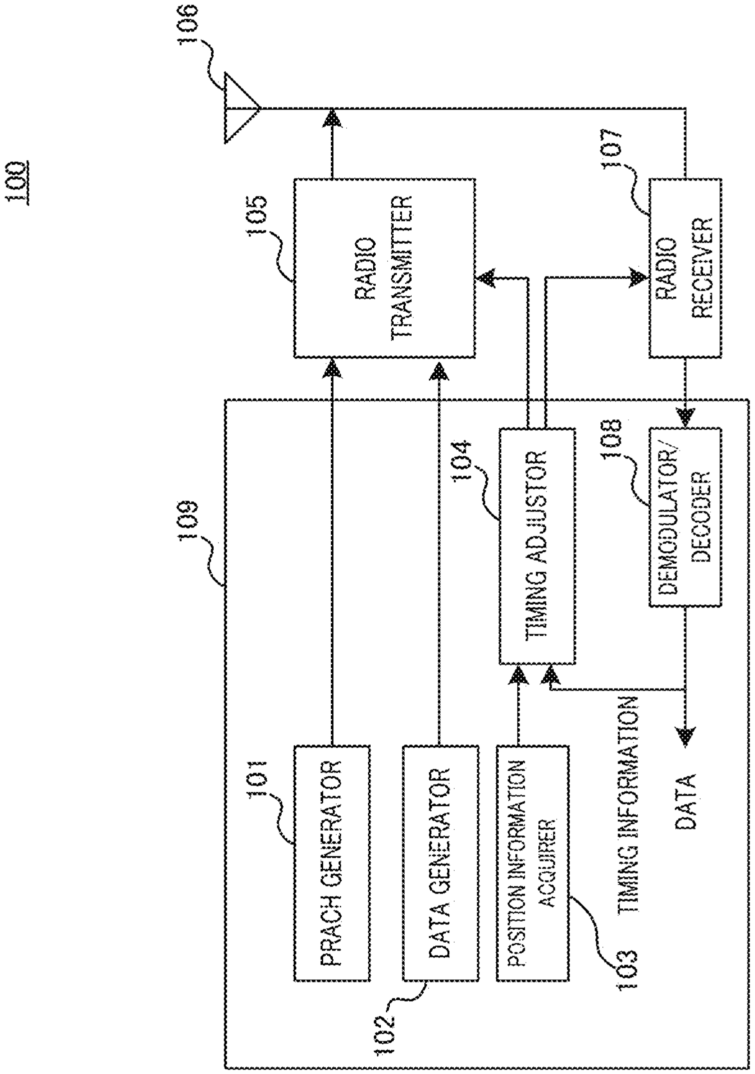
FIG. 6 is a block diagram illustrating an exemplary configuration of the terminal according to Embodiment 1.

FIG. 6 is a block diagram illustrating an exemplary configuration of terminal 100 according to Embodiment 1. Terminal 100 includes PRACH generator 101, data generator 102, position information acquirer 103, timing adjustor 104, radio transmitter 105, antenna 106, radio receiver 107, and demodulator/decoder 108. PRACH generator 101, data generator 102, position information acquirer 103, timing adjustor 104, and demodulator/decoder 108 may be included in controller 109.

For example, PRACH generator 101 determines a transmission resource of PRACH from PRACH transmission resource candidates available in the cell of base station 200. For example, PRACH generator 101 configures a time/frequency resource and a Preamble number to be used for PRACH transmission based on time/frequency resources and a group of Preamble numbers available for PRACH transmission. For example, the information on the time/frequency resources and the group of Preamble numbers available for PRACH transmission is indicated from base station 200.

Data generator 102 generates an uplink transmission data sequence, and generates a data signal to be transmitted in a time/frequency resource for data signal transmission allocated by base station 200 and by using Modulation and Coding Scheme (MCS).

Position information acquirer 103 acquires position information (information such as latitude, longitude, and altitude) of terminal 100 and position information on the satellite of the communication partner by using a GNSS function such as GPS. Position information acquirer 103 calculates a distance between terminal 100 and the satellite, and outputs the calculated distance information to timing adjustor 104. The position information on the satellite may be obtained, for example, by obtaining orbital information called satellite ephemeris and/or temporal information in advance.

Timing adjustor 104 adjusts reception timing of a reception signal and transmission timing of a transmission signal. For example, timing adjustor 104 adjusts transmission timing based on the information indicated or broadcast from base station 200 and/or the information calculated by timing adjustor 104.

For example, timing adjustor 104 calculates a propagation delay time between the satellite and terminal 100 from the distance information output from position information acquirer 103 and the radio wave propagation speed. Then, timing adjustor 104 adjusts the transmission timing based on one or more combinations of a reception timing of the signal transmitted from base station 200, the calculated propagation delay time, a cell-common timing adjustment value broadcast from base station 200, and a timing adjustment value (e.g., TA value) of terminal 100 indicated from base station 200. The timing adjustment may vary depending on the channel and/or the signal to be transmitted. For example, the timing adjustment may vary depending on PRACH, PUSCH, a Physical Uplink Control Channel (PUCCH), and a Sounding Reference Signal (SRS). Note that an exemplary timing adjustment will be described later.

Radio transmitter 105 performs transmission processing such as D/A conversion and up-conversion on the signal output from PRACH generator 101 and the data signal output from data generator 102. Radio transmitter 105 transmits a radio signal obtained by the transmission processing from antenna 106 to base station 200 at the transmission timing adjusted by timing adjustor 104.

Radio receiver 107 receives a reception signal from base station 200 via antenna 106 at the reception timing adjusted by timing adjustor 104. The reception signal may be, for example, a downlink signal of a Physical Downlink Control Channel (PDCCH) or a Physical Downlink Shared Channel (PDSCH). The reception signal may also include data and/or control information. Radio receiver 107 performs reception processing such as down-conversion and A/D conversion on the reception signal, and outputs the signal resulting from the reception processing to demodulator/decoder 108.

Demodulator/decoder 108 performs demodulation and decoding processing on the signal output from radio receiver 107. For example, demodulator/decoder 108 demodulates and decodes a response-data signal of PRACH. For example, when the demodulated and decoded information includes information on the transmission timing and the reception timing, demodulator/decoder 108 outputs the information to timing adjustor 104.

[Configuration of Base Station]

Figure 7:
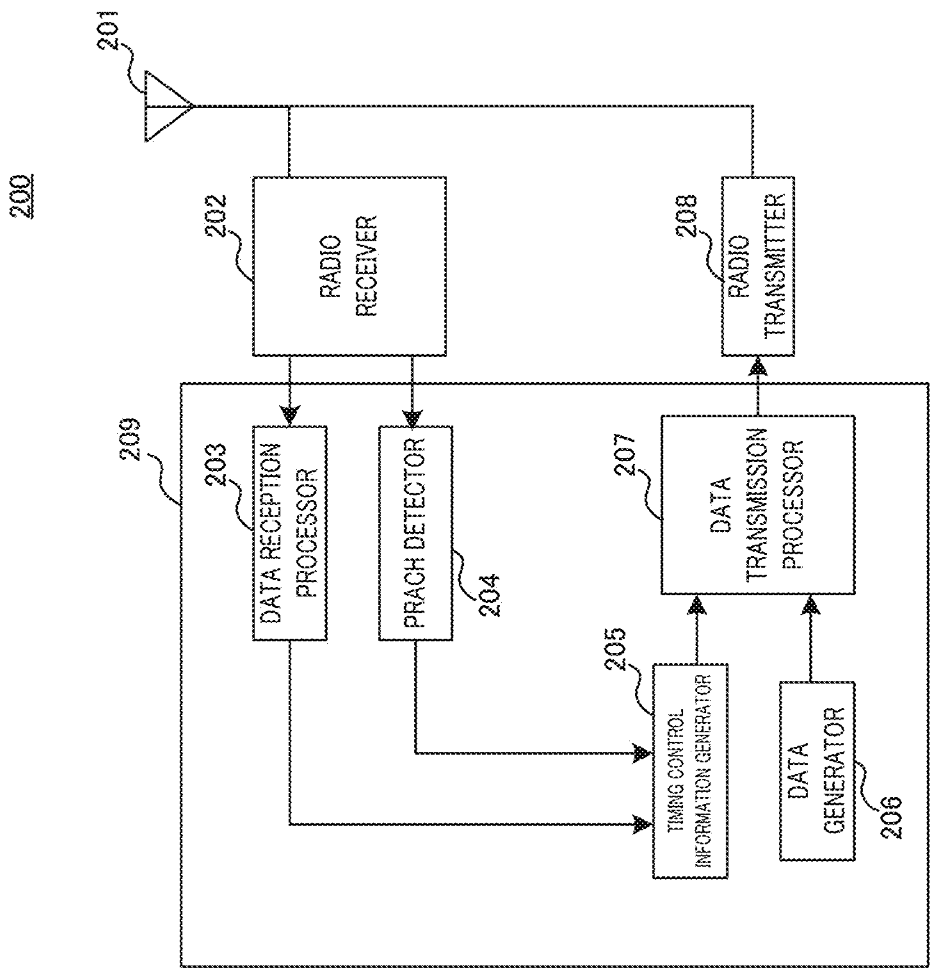
FIG. 7 is a block diagram illustrating an exemplary configuration of the base station according to Embodiment 1.

FIG. 7 is a block diagram illustrating an exemplary configuration of base station 200 according to Embodiment 1. Base station 200 includes antenna 201, radio receiver 202, data reception processor 203, PRACH detector 204, timing control information generator 205, data generator 206, data transmission processor 207, and radio transmitter 208. Data reception processor 203, PRACH detector 204, timing control information generator 205, data generator 206, and data transmission processor 207 may be included in controller 209.

Radio receiver 202 performs reception processing such as down-conversion and A/D conversion on the data signal and the PRACH signal received from terminal 100 via antenna 201, and outputs the signal resulting from the reception processing to data reception processor 203 and PRACH detector 204.

Data reception processor 203 performs demodulation/decoding processing on the received data signal other than the PRACH. Further, data reception processor 203 may perform channel estimation and timing estimation based on the received data signal. Data reception processor 203 outputs information on the estimated timing to timing control information generator 205.

PRACH detector 204 performs correlation processing for the received Preamble signal of PRACH with a replica signal of the Preamble signal generated by using a sequence number corresponding to the configured Preamble number and the amount of cyclic shift, detects the Preamble signal of PRACH, and estimates the transmission timing and the reception timing.

Note that the correlation processing in PRACH detector 204 may be processing of calculating a delay profile in a time domain, or processing of calculating a delay profile by performing correlation processing (division processing) in a frequency domain and then performing an Inversed Fast Fourier Transform (IFFT). The calculated delay profile may be used to estimate transmission timing and/or reception timing.

For example, PRACH detector 204 outputs the information on the estimated transmission timing and/or reception timing to timing control information generator 205. For example, PRACH detector 204 calculates a difference between the reference timing of base station 200 and the arrival timing of the received signal, and outputs the calculation result to timing control information generator 205.

Timing control information generator 205 generates a TA command for terminal 100 based on the information (e.g., the timing estimation result) output from PRACH detector 204 and data reception processor 203. There may be a plurality of types of TA commands. In addition, timing control information generator 205 generates a cell-common timing adjustment value. The cell-common timing adjustment value is generated based on, for example, at least one of a size of a cell formed by the satellite beam, a length of the feeder link, and/or a delay amount of the feeder link.

Data generator 206 generates downlink data signals such as user data, a synchronization signal, system information (broadcast information), individual control information (e.g., RRC control information), and MAC control information for terminal 100. Data generator 206 outputs the generated downlink data signals to data transmission processor 207.

Data transmission processor 207 encodes and modulates the downlink data signals output from data generator 206 and the information output from timing control information generator 205, and outputs the modulated signal to radio transmitter 208.

Radio transmitter 208 performs transmission processing such as D/A conversion, up-conversion, and amplification on the signal output from data transmission processor 207, and transmits the radio signal obtained by the transmission processing via antenna 201.

[Exemplary Timing Adjustment]

Next, a timing adjustment in Embodiment 1 will be described. Terminal 100 performs timing adjustment with one or more timing adjustment values.

Exemplarily, two timing adjustments are performed: a timing adjustment with relatively fine granularity and a timing adjustment with relatively coarse granularity.

In the timing adjustment with relatively fine granularity, terminal 100 performs a transmission timing adjustment in sample units. For example, the transmission timing is adjusted so that reception is performed within a CP length of a PUSCH OFDM symbol or a PRACH symbol in base station 200. In the timing adjustment with relatively coarse granularity, terminal 100 performs a transmission timing adjustment in slot units and/or OFDM symbol units. For example, the transmission timing is adjusted so that reception is performed in a slot or OFDM symbol assumed by base station 200 in base station 200.

The timing adjustment values for performing an adjustment with fine granularity are, for example, as follows:

- Timing adjustment value based on position information calculated by the terminal
- Timing adjustment value by the first path tracking calculated by the terminal
- Timing adjustment value based on TA command 1 transmitted from the base station (Fine TA command)

Further, the timing adjustment values for performing an adjustment with coarse granularity are, for example, as follows:

- Cell-specific timing adjustment (cell-specific TA offset) broadcast from the base station
- Terminal-specific timing adjustment value ($K_{adj,UE}$) indicated from the base station Timing adjustment value based on TA command 2 transmitted from the base station (Coarse TA command)

Among the above-described timing adjustment values, the timing adjustment value by the first path tracking calculated by the terminal will be described in Embodiment 2.

Next, exemplary timing control using the above-described timing adjustment values will be described.

Figure 8:
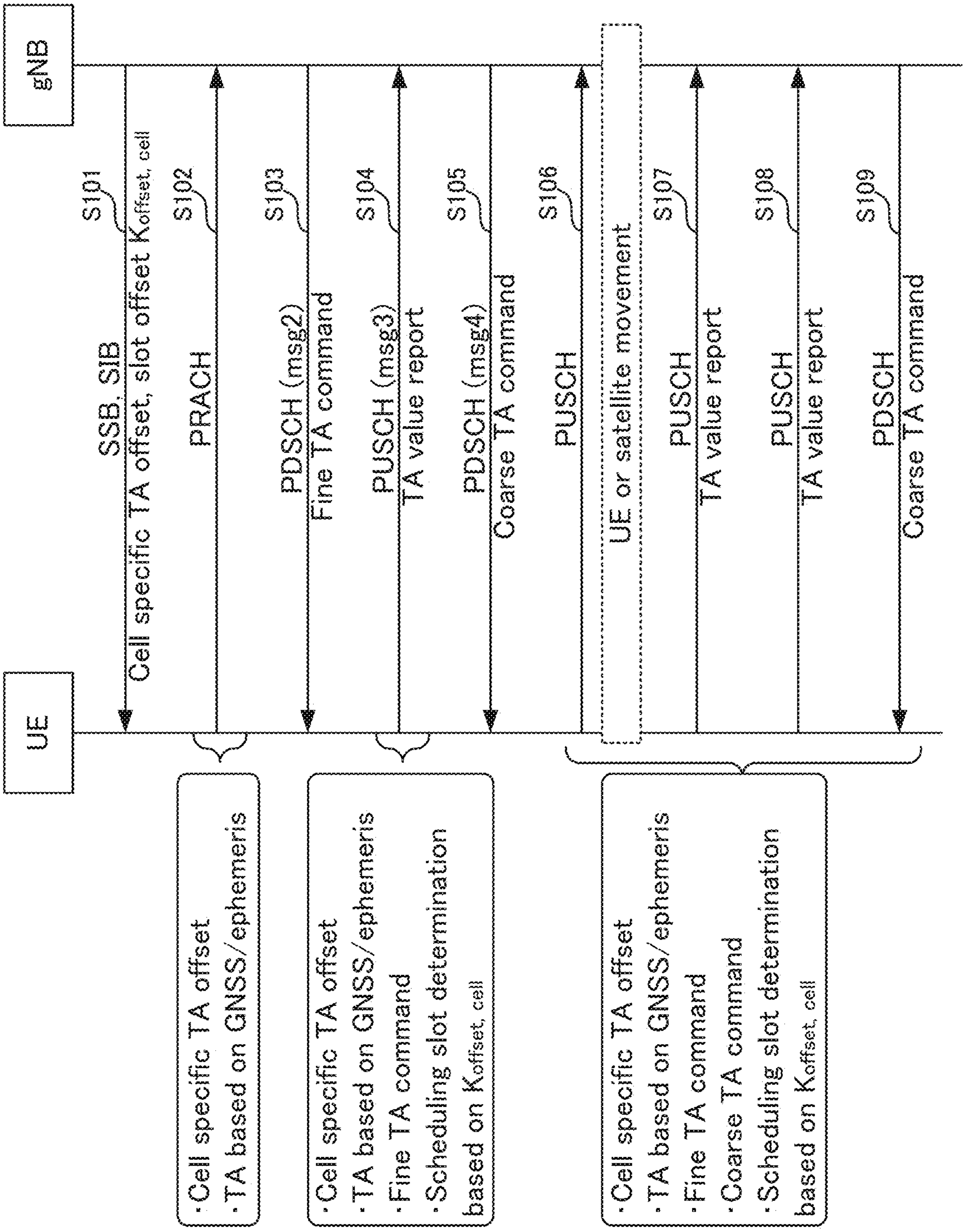
FIG. 8 is an exemplary sequence chart of timing control in Embodiment 1.

FIG. 8 is an exemplary sequence chart of timing control in Embodiment 1. FIG. 8 illustrates exemplary signals transmitted and received (or channels used for transmission and reception of signals) between terminal 100 (UE) and base station 200 (gNB), and exemplary timing adjustment values used by UE for transmitting signals. In the following description, each process of step 101 (S101) to S109 in FIG. 8 will be described.

<S101>

The base station (gNB) transmits SSB and a System Information Block (SIB). The SSB and SIB may be transmitted periodically. The SSB includes a signal for synchronization and cell-specific basic control information (e.g., Master Information Block). Further, the SIB includes cell-specific information for the terminal to access the base station or the like. Furthermore, the SIB may include information (e.g., satellite ephemeris) indicating the position of the satellite. The SIB includes a Cell specific TA offset and slot offset ($K_{offset,\ cell}$) indicating a slot position of the data allocation.

<S102>

The terminal receives the SSB and SIB, and transmits PRACH for the initial access. The terminal herein adjusts the transmission timing of the PRACH. For example, the terminal performs a timing adjustment using the value of the cell-specific TA offset broadcast from the base station and the timing adjustment value based on the position information calculated by the terminal. The timing adjustment value based on the position information may be described as "TA based on GNSS/ephemeris" or "GNSS/ephemeris based TA".

An exemplary calculation of the timing adjustment value based on the position information will now be described. The terminal obtains position information on the terminal using a GNSS function or the like. The terminal calculates a distance between the satellite and the terminal from the held or indicated position information on the satellite and the position information on the terminal. Then, the terminal calculates a one-way propagation delay time by dividing the calculated distance by the radio wave propagation speed (e.g., $3\times10^8$ [m/s]). A time obtained by doubling the calculated propagation delay time corresponds to a round-trip propagation delay time (Round Trip Time: RTT). The calculated round-trip propagation delay time is a timing adjustment value based on the position information. Note that the timing adjustment value based on the position information may be a value obtained by adding the processing delay time of the terminal and/or the base station to the calculated round-trip propagation delay time.

A value obtained by adding the cell-specific TA offset value broadcast from the base station to the timing adjustment value based on the position information is the TA value.

For example, the terminal determines a value $TA_{final}$ used for the timing adjustment with Equations 1, 2, and 3. Note that, $TA_{final}$ determined by Equation 1, $TA_{NTN\_offset}$ determined by Equation 2, and $TA_{coarse}$ determined by Equation 3 may be in nano-second (ns) units, for example.

$$TA_{final}=(N_{TA}+N_{TAoffset})\times T_c+TA_{NTN\_offset} \quad \text{(Equation 1)}$$

$$TA_{NTN\_offset}=TA_{location}+TA_{coarse} \quad \text{(Equation 2)}$$

$$TA_{coarse}=(M_{offset,cell}+M_{coarse})\times10^6/2^{\mu} \quad \text{(Equation 3)}$$

The first term on the right side of above Equation 1 is the same as that in Rel.15 NR specification. Note that, as described in TS38.211 V15.8.0 section 4.1, Tc=0.509 ns and $N_{TA}$ is a value corrected by the TA command transmitted from the base station. For example, $N_{TA}$ is zero in the case of PRACH transmission. $N_{TAoffset}$ is an offset value used for the timing adjustment between base stations. $TA_{final}$, which is a TA value calculated by Equation 1, means the same as $T_{TA}$ described in section 4.3.1 of TS38.211 V15.8.0, for example, and is obtained by adding the correction term for NTN $TA_{NTN\_offset}$ represented by Equation 2 to the first term of Equation 1 that is the same as that in Rel.15 NR specification. Because Rel.15 NR specification can be reused, the extension to NTN can be realized with a small change amount.

$TA_{location}$ represents a round-trip propagation delay time calculated based on the position information. For example, $TA_{location}$ may be represented by ns.

The term of $10^6/2^{\mu}$ in Equation 3 represents a slot length in the case of parameter μ representing the subcarrier spacing, and, for example, the unit may be represented by ns. For example, parameter p representing the subcarrier spacing is determined that μ=0, 1, 2, 3, 4 for the subcarrier spacing of 15 kHz, 30 kHz, 60 kHz, 120 kHz, 240 kHz, respectively.

$M_{offset,cell}$ is a cell-specific TA offset. The cell-specific TA offset indicates, for example, the number of slots to be shifted. $M_{coarse}$ is set to zero at the time of PRACH transmission with the offset to be described later. Note that these offsets may indicate a time (e.g., ms units) to be offset instead of the number of slots. Note that, in the case of the offset indicating a time, the offset need not be multiplied by a term of $10^6/2^{\mu}$ representing a slot length, or may be multiplied or divided by another coefficient.

The terminal transmits an uplink signal at the timing advanced by the above-described TA value ($TA_{final}$) from the downlink reference reception timing of SSB or the like.

Figure 9:
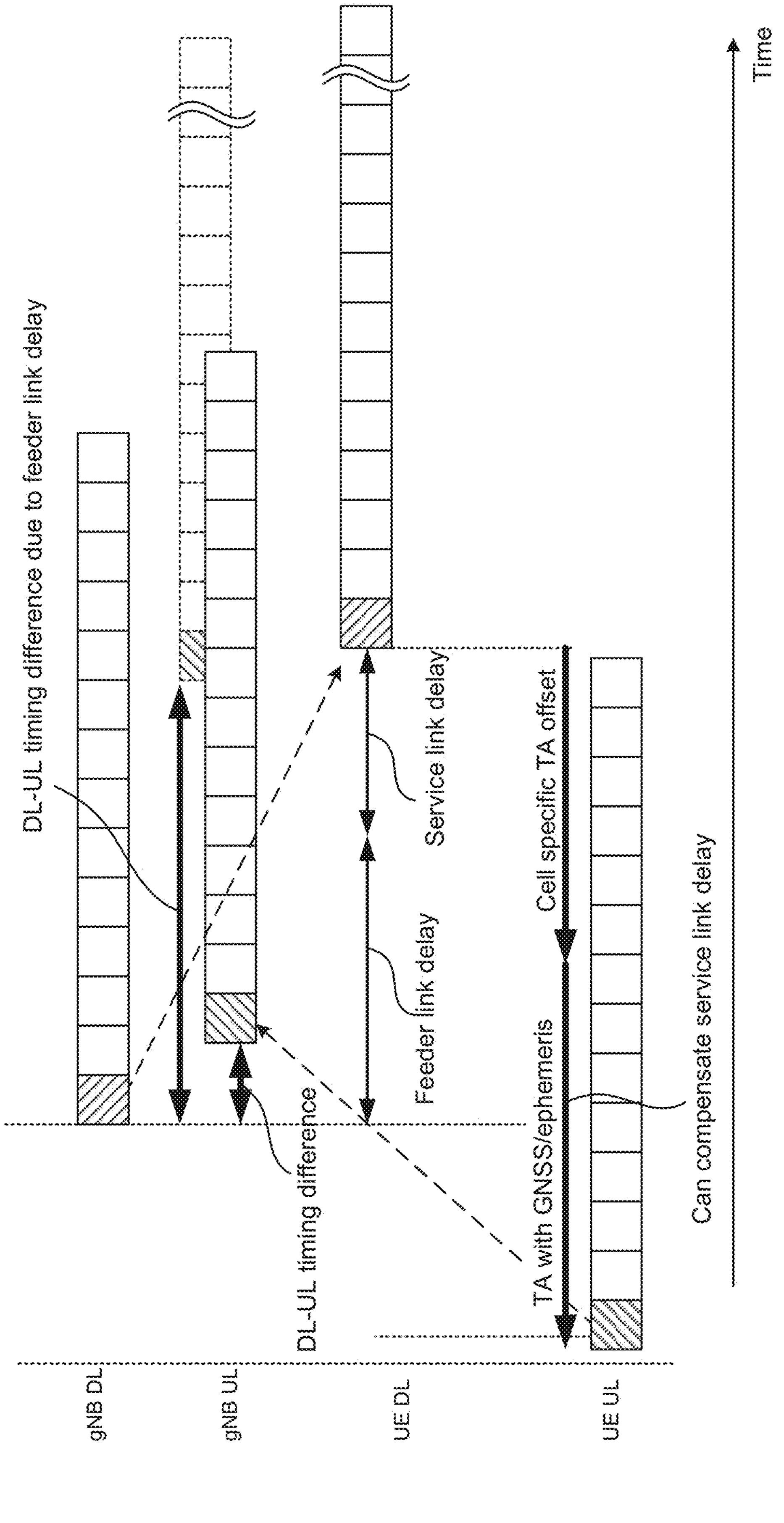
FIG. 9 illustrates an exemplary timing adjustment using a cell-specific TA offset value and a timing adjustment value based on position information.

FIG. 9 illustrates an exemplary timing adjustment using a cell-specific TA offset value and a timing adjustment value based on the position information.

FIG. 9 exemplarily illustrates a DL transmission slot and a UL reception slot of the base station (gNB), and a DL reception slot and a UL transmission slot of the terminal (UE). Note that the horizontal axis in FIG. 9 represents a time axis.

FIG. 9 illustrates an exemplary uplink signal transmitted at the transmission timing advanced by the TA value from the downlink reference reception timing. The TA value in FIG. 9 is represented by the sum of a cell-specific offset value and a timing adjustment value based on the position information.

Further, the term "DL-UL timing difference due to feeder link delay" in FIG. 9 indicates a DL-UL timing difference caused by a feeder link delay occurred when the cell-specific offset value is not used.

Using the cell-specific TA offset value allows the base station to shorten the DL-UL timing difference caused by the feeder link delay.

A DL-UL timing difference of a few 100 ms may occur due to the propagation delay of the round trip of satellite communication. It is difficult to manage the DL-UL timing difference in some implementation of the base station. As described above, by using the cell-specific TA offset, the DL-UL timing difference can be a degree (e.g., within 10 ms) manageable by the base station. In the case of a non-geostationary satellite such as LEO, the propagation delay of the feeder link varies depending on the position of the non-geostationary satellite, which changes over time. Therefore, the shortest delay amount of the feeder link delay time may be corrected. The delay amount may be only corrected to be a degree with which the base station can easily manage the DL-UL timing difference; therefore, indicating a value with coarse granularity such as in slot units and OFDM symbol units to the terminal can suppress an increase in indication overhead, which makes it possible to support a long-delay environment of satellite communication, such as the NTN environment.

<S103>

The base station receives PRACH and detects the difference between the base station reference timing and the PRACH reception timing. The base station determines TA command 1 (Fine TA command in FIG. 8) for correcting the timing corresponding to the detected difference, and transmits PDSCH including determined TA command 1. TA command 1 may be, for example, the same TA command as Rel.15 NR. Further, the response to the terminal including TA command 1 in S103 may be referred to as a RACH response (RAR).

The CP length of PRACH is set to be longer than the CP length of PUSCH. Therefore, even when PRACH is received within the CP length of PRACH, the reception timing of PUSCH transmitted by the terminal after the PRACH may be outside the CP length. In this step, the base station transmits TA command 1 and controls the transmission timing of the terminal to be within the CP length of PUSCH.

<S104>

The terminal transmits PUSCH in the time/frequency resource specified by RAR. The time resource is a slot corresponding to the slot number that has been offset by the amount of $K_{offset,cell}$ indicated by SIB from the base station, and the terminal transmits at the timing when the base station receives at the slot of this slot number. At this time, the terminal further adjusts the timing in accordance with the indicated TA command 1 from the timing of PRACH transmission. For example, the terminal performs a timing adjustment with $TA_{final}$ determined using the value of TA command 1 for $N_{TA}$ in Equation 1, and transmits PUSCH.

Further, the terminal may indicate the timing information to the base station (TA value report in FIG. 8). For example, the terminal may indicate $TA_{final}$ determined by Equation 1, or may indicate $TA_{NTN\_offset}$ or $TA_{location}$, either of which is an unknown value to the base station. In both cases, the values are indicated with being rounded to coarse granularity such as in slot-length units or in OFDM symbol-length units. For example, a round or floor operation may be used for the conversion to coarse granularity. Because this indication is used for controlling an allocation slot of PUSCH and/or HARQ-ACK in the base station, the indication may be, for example, an indication with coarse granularity such as in slot units. The indication with coarse granularity can reduce indication overhead. Further, the terminal may indicate the position information obtained by GNSS as a substitute for $TA_{location}$, or may indicate both $TA_{location}$ and the position information. The position information to be indicated may be, for example, the position information having granularity of approximately 1 km or the position information whose value equal to or less than a decimal point of latitude and longitude is restricted so that the calculation error of the propagation delay is equal to or less than a predetermined value. Further, the position information may reuse the information used for the control of band over or the like.

<S105>

The base station transmits information for contention resolution in the random access, RRC configuration information, and/or the like using PDSCH. For example, the base station transmits MAC CE including TA command 2 (Coarse TA command in FIG. 8). TA command 2 is, for example, a timing adjustment command with granularity of slot units. The base station configures TA command 2 based on the information on the TA value indicated by the terminal in S104.

For example, the larger the TA value indicated from the terminal to the base station is, the longer the propagation delay is; therefore, the base station may configure TA command 2 to be indicated to the terminal to be a smaller value. In this case, the slot of PUSCH and/or HARQ-ACK allocated by DCI is a slot of later timing, that is, a slot whose slot number is larger. The terminal can transmit PUSCH or HARQ-ACK after a sufficient preparation time for transmission after receiving DCI or PDSCH.

On the other hand, the smaller the TA value indicated from the terminal is, the shorter the propagation delay is; therefore, TA command 2 may be configured to be a larger value. In this case, the slot of PUSCH and/or HARQ-ACK is a slot of earlier timing, that is, a slot whose slot number is smaller. When the propagation delay is relatively short, even though the timing is adjusted to an earlier timing in TA command 2, the terminal can transmit PUSCH or HARQ-ACK after a sufficient transmission preparation time after receiving DCI or PDSCH. For example, when $K_{offset,cell}$ is configured to match with the propagation delay occurred in the terminal located at a position furthest from the satellite in the cell, TA command 2 to be indicated to the terminal located at a position farthest from the satellite may be set to zero. In this case, the terminal located at a position closer to the satellite may be indicated with larger TA command 2. By such control, a terminal closer to the satellite can perform transmission with a lower delay.

In addition, when the position information is indicated from the terminal in S104, the base station may estimate the TA value of the terminal based on the indicated position information, and configure TA command 2 in the same manner as described above.

In addition, TA command 2 may be transmitted with being included in RRC configuration information.

<S106>

The terminal uses a TA value ($TA_{final}$ in Equation 1) determined by configuring $M_{coarse}$ in Equation 2 to be the value indicated by TA command 2 for the subsequent timing adjustment for PUSCH and HARQ-ACK transmissions.

Figure 10:
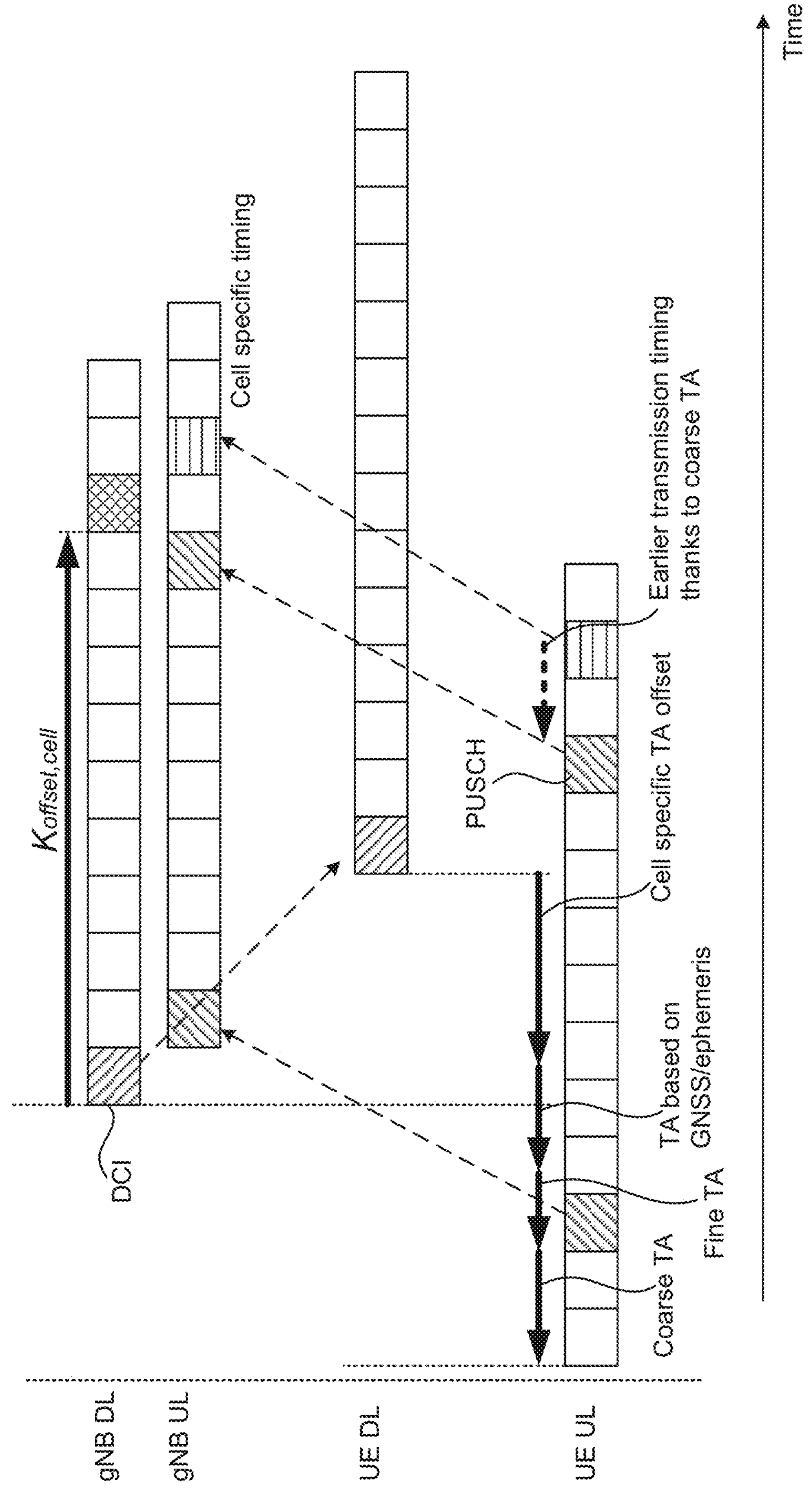
FIG. 10 illustrates an exemplary timing adjustment using each of TAs including TA command 2.

FIG. 10 illustrates an exemplary timing adjustment using each of TAs including TA command 2

FIG. 10 exemplarily illustrates a DL transmission slot and a UL reception slot of the base station (gNB), and a DL reception slot and a UL transmission slot of the terminal (UE). Note that the horizontal axis in FIG. 10 represents a time axis.

The term "Coarse TA" in FIG. 10 indicates TA indicated by TA command 2. The term "Fine TA" in FIG. 10 indicates TA indicated by TA command 1. The terms "TA based on GNSS/ephemeris" and "Cell specific TA offset" in FIG. 10 may be the same as "TA based on GNSS/ephemeris" and "Cell specific TA offset" illustrated in FIG. 9, respectively.

Further, the term "Cell specific timing" in FIG. 10 is PUSCH reception timing of the base station assumed in the case of transmission without TA command 2, such as transmission of the above-described msg3. For example, the timing is configured to be the timing at which the terminal located at a position farthest from the satellite in a certain cell can transmit, considering the round-trip propagation delay time of the terminal located at a position farthest from the satellite. On the other hand, because the timing matches the timing for the farthest terminal, a useless delay occurs for the terminal closer to the satellite. As illustrated in FIG. 10, using coarse TA indicated by TA command 2 can make transmission/reception timing of PUSCH earlier than Cell specific timing.

In this case, Mc in Equation 2 may be converted depending on the granularity of TA command 2. For example, when the granularity is in OFDM symbol units, the value indicated by TA command 2 (a value in slot units) may be divided by 14, which is the number of OFDM symbols per slot, and may be converted into a value in OFDM symbol units

<S107, S108>

When the satellite and/or the terminal moves by a threshold value of the moving distance or beyond, the terminal calculates the propagation delay from the GNSS position information and the position information from the satellite ephemeris again, updates $TA_{location}$ in Equation 1, and performs uplink transmission. Note that the update of $TA_{location}$ is not limited to the case where the satellite and/or the terminal moves by a threshold value or beyond, and may be performed in a predetermined period, for example. Alternatively, the update may be performed both when the satellite and/or the terminal moves by a threshold value or beyond and in a predetermined period.

The frequency and period of updating $TA_{location}$ or the threshold value of the moving distance may be indicated from the base station. Instead of the threshold value of the moving distance, the amount of change in the TA value resulting in the movement may be indicated. The frequency and period of updating $TA_{location}$ or the threshold value of the moving distance may be pre-determined.

In addition, when the amount of the round-trip propagation delay is changed by a predetermined value or more (e.g., by a time corresponding to ½ slot or more), the terminal may indicate the information on the corrected timing value and/or the position information to the base station in the same manner as in S104. When there is no change of the predetermined value or more in the amount of the round-trip propagation delay, the terminal may transmit user data without indicating the information on the corrected timing value and/or the position information. In this case, for example, when the base station indicates the position information on the terminal, even though the propagation delay amount is changed due to the movement of the satellite, for a stationary terminal or a terminal whose movement amount is a threshold value or less, the base station can grasp the amount of change in TA based on the previously-indicated position information on the terminal. Therefore, the frequent indication of the position information on the terminal can be avoided, and the indication overhead of the position information can be reduced

<S109>

When the round-trip propagation delay of the terminal changes by a predetermined value or more (e.g., by one slot or more), the base station transmits TA command 2 to change an allocation slot of PUSCH and/or HARQ-ACK of the terminal.

As in the sequence chart described above, the terminal performs two timing adjustments: a timing adjustment with relatively fine granularity and a timing adjustment with relatively coarse granularity. Further, the terminal performs different timing adjustments in accordance with the channel and/or the signal to be transmitted.

Note that the information indicated from the base station to the terminal in the above-described sequence diagram is merely an example, and the present disclosure is not limited thereto. For example, the information indicated by TA command 2 in S105 and S109 described above may be indicated by an offset value ($K_{adj,UE}$) for an allocation slot, instead of the TA command. The offset value ($K_{adj,UE}$) is a timing adjustment value for each terminal, for example.

When the information is indicated by the offset value ($K_{adj,UE}$), $M_{coarse}$ in Equation 3 may be set to zero. Further, when the information is indicated by the offset value ($K_{adj,UE}$), the terminal interprets the allocation slot of PUSCH as "$n+K_2+K_{offset,cell}-K_{adj,UE}$". In this case, n is a slot in which the DCI performing the allocation of PUSCH is transmitted, and $K_2$ is a value indicated by the DCI. For example, a time required to prepare for PUSCH transmission after DCI reception and/or a time until the next transmittable uplink slot is configured to $K_2$. The offset value ($K_{adj,UE}$) may take a negative value.

Figure 11:
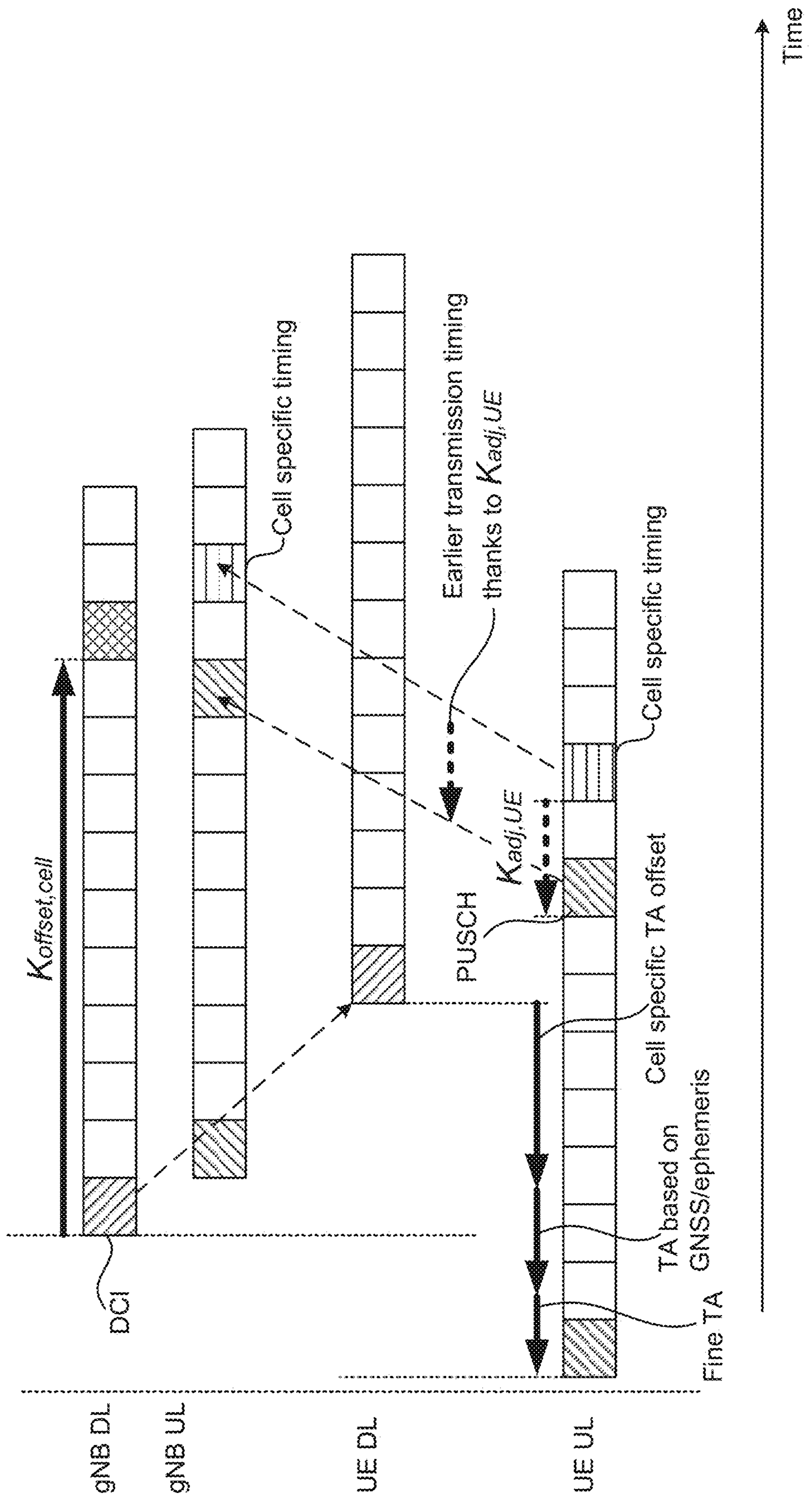
FIG. 11 illustrates an exemplary timing adjustment using information including $K_{adj,UE}$.

FIG. 11 illustrates an exemplary timing adjustment using information including $K_{adj,UE}$.

FIG. 11 exemplarily illustrates a DL transmission slot and a UL reception slot of the base station (gNB), and a DL reception slot and a UL transmission slot of the terminal (UE). Note that the horizontal axis in FIG. 11 represents a time axis.

In FIG. 11, the terminal determines the allocation slot of PUSCH to be a slot shifted from the slot of "Cell specific timing" by the offset value of $K_{adj,UE}$.

Note that, in FIG. 11, the case has been described in which $K_{adj,UE}$ is used to determine the allocation slot of PUSCH, but the present disclosure is not limited thereto. For example, the offset value of $K_{adj,UE}$ may be applied in the determination of HARQ-ACK transmissions and/or a transmission slot of SRS. When the offset value is applied to HARQ-ACK transmission, n may be a PDSCH slot subjected for HARQ-ACK. Further, when the offset value is applied to SRS transmission, n may be a DCI slot indicating SRS transmission. Because the information indicating an offset from $K_{offset,cell}$ is indicated instead of the TA command, the information amount to be indicated can be reduced. The granularity of the offset to be indicated may be in slot units or OFDM symbol units. Finer timing control can be performed with OFDM symbol units. Further, the offset value of $K_{adj,UE}$ may be non-applied, or different offset values may be used, depending on the channels and/or the signals.

As described above, in Embodiment 1, performing timing control with coarse granularity in addition to timing control with fine granularity can suppress an increase in indication overhead, and can realize transmission timing control of the terminal suitable for the environment of the satellite communication in which the propagation delay is long and the difference in the propagation delay is large between terminals.

Embodiment 2

In Embodiment 2, the timing adjustment by path tracking is further performed in Embodiment 1.

[Configuration of Terminal]

The configuration of the terminal according to Embodiment 2 may be the same as the configuration of terminal 100 described in Embodiment 1. However, the processing in timing adjustor 104 of terminal 100 described in Embodiment 1 is newly added.

Timing adjuster 104 calculates a timing adjustment value corresponding to the amount of change in the reception timing, tracking the reception timing of SSB, PDCCH or PDSCH received by radio receiver 107. When a plurality of paths (e.g., delayed waves) are detected, the tracked reception timing may be the timing of the first path. Then, timing adjustor 104 performs timing adjustment using any one or more of the calculated timing adjustment value by the path tracking and the timing adjustment value described in Embodiment 1.

[Exemplary Timing Adjustment]

Next, a timing adjustment in Embodiment 2 will be described.

For example, the terminal determines a value $TA_{final}$ to be used for the timing adjustment with Equations 4 and 5. Note that $TA_{final}$ determined by Equation 4 may be, for example, in nano second (ns) units.

$$TA_{final}=(N_{TA}+N_{TAoffset})\times T_c+TA_{NTN\_offset} \quad \text{(Equation 4)}$$

$$TA_{NTN\_offset}=TA_{location}+TA_{path}+TA_{coarse} \quad \text{(Equation 5)}$$

Note that, in Equation 4 and Equation 5, the description of the same parameters as those of Equation 1, Equation 2, and Equation 3 will be omitted. Equation 4 is the same as Equation 1, but the second term on the right side of Equation 4 is represented by Equation 5. On the right side of Equation 5, $TA_p$ is added to the parameter on the right side of Equation 2. $TA_{path}$ is a timing adjustment value by path tracking.

The terminal may selectively use a case of performing a timing adjustment based on the position information or a case of performing a timing adjustment based on the path tracking in addition to the timing adjustment based on the position information, depending on the uplink transmission channel and/or transmission timing of the terminal. For example, in a case where the timing adjustment based on the position information is performed (in other words, a case where a timing adjustment is not performed with path tracking), $TA_{path}$ may be set to zero. Which of the two cases to be used may be indicated to the terminal by control information from the base station. Alternatively, a rule may be defined in advance, and the terminal may select a case in accordance with the defined rule.

For example, examples to which the two cases are applied will be described below.

Cases in which a timing adjustment based on the position information is performed, that is, cases in which the timing adjustment based on path tracking is not performed, are, for example, the following cases.

- PRACH transmission
- SRS transmission
- First transmission after waking up from a sleep interval (long sleep and/or short sleep) of DRX
- First transmission after TA valid timer expires
- Transmission in an IDLE or INACTIVE state Further, cases in which a timing adjustment based on the position information and a timing adjustment based on path tracking are performed are, for example, the following cases.

- RRC_CONNECTED state
- Second and subsequent transmissions after waking up from sleep Next, an exemplary timing control using the above-described timing adjustment value will be described.

Figure 12:
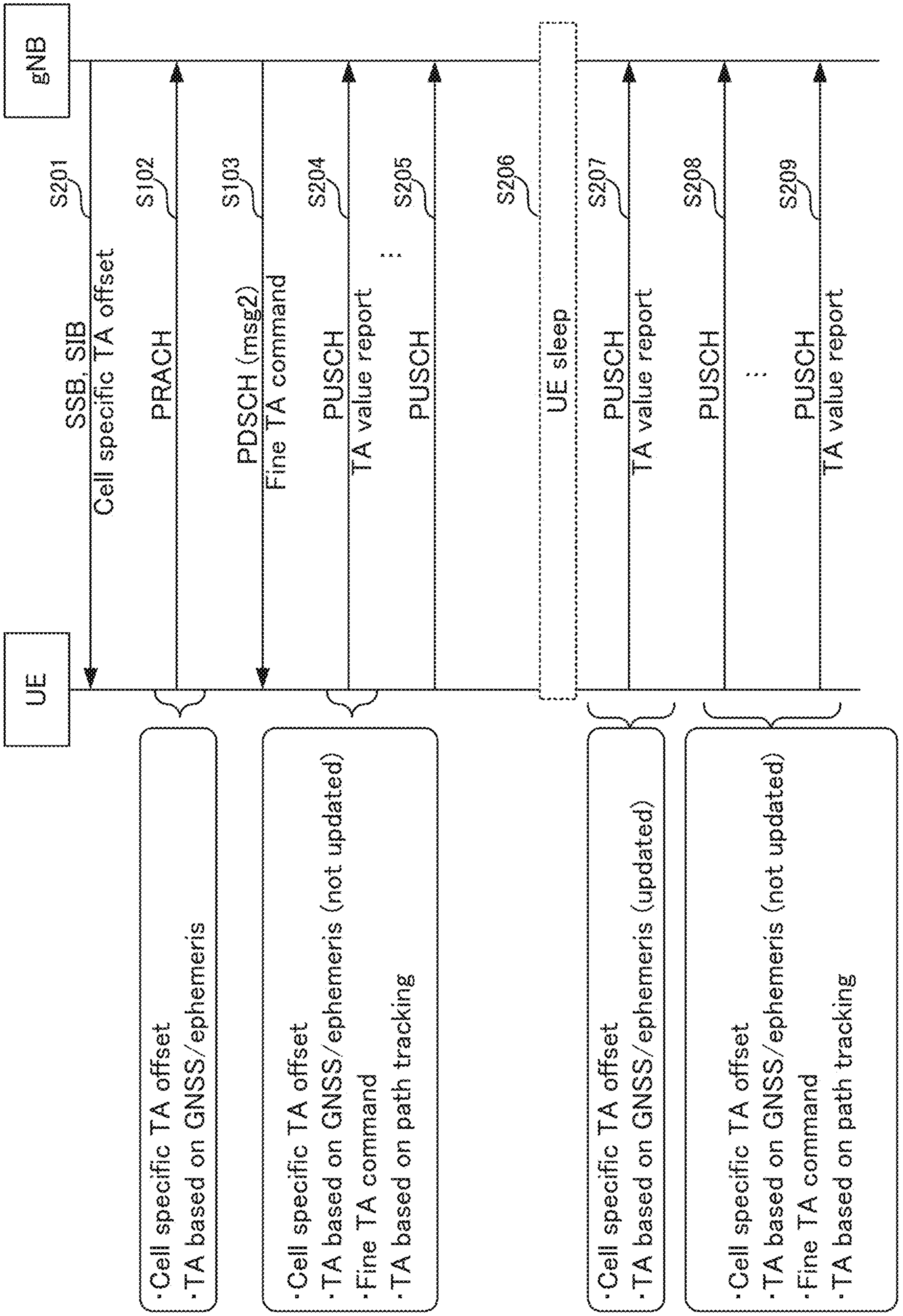
FIG. 12 illustrates an exemplary sequence chart of timing control according to Embodiment 2.

FIG. 12 is an exemplary sequence chart of timing control in Embodiment 2. Similarly to FIG. 8, FIG. 12 illustrates exemplary signals transmitted and received (or channels used for transmission and reception of signals) between terminal 100 (UE) and base station 200 (gNB), and exemplary timing adjustment values used by UE for signal transmissions. Note that, in FIG. 12, the same processing as in FIG. 8 is denoted by the same reference numerals, and description thereof may be omitted.

<S201>

The base station (gNB) transmits SSB and SIB. The SSB and SIB may be transmitted periodically. The SSB includes a signal for synchronization and cell-specific basic control information. Further, the SIB includes cell-specific information for the terminal to access the base station or the like. Furthermore, the SIB may include information (e.g., satellite ephemeris) indicating the position of the satellite. A cell specific TA offset is included in the SIB.

<S204 and S205>

The terminal stores SSB reception timing (first path timing) in the calculation of the timing adjustment value $TA_{location}$ based on the position information in PRACH transmission (S102 in FIG. 12). Then, the terminal receives SSB, PDCCH or PDSCH at a certain interval, and monitors a change in the timing of the first path. The terminal changes (updates) transmission timing when there is a certain degree of change. When the change in the timing of the path is $\Delta_{path}$, the terminal determines that $TA_{path}=2\times\Delta_{path}$. In Equations 4 and 5, the terminal determines $TA_{final}$ using the respective timing adjustment values including $TA_{path}$, and performs the timing adjustment with the determined $TA_{final}$ to transmit PUSCH.

Further, the terminal may update the timing when the amount of change in the reception timing of the path is equal to or larger than a threshold value. The interval for updating the TA value and/or the threshold value of the amount of change to determine whether to update the TA value may be specified by the base station or may be pre-determined.

Similarly to Embodiment 1, the terminal indicates the timing information (e.g., at least one of the TA value and/or the position information) to the base station (TA value report in FIG. 12). For example, the terminal may indicate the sum of $TA_{location}$ and $TA_{path}$. Similarly to Embodiment 1, the value may be indicated with being rounded to coarse granularity such as in slot-length units or OFDM symbol-length units.

The terminal sleeps when there is no data to be communicated. The sleep operation may be performed in the same manner as Rel.15 NR described in TS38.821. Note that the sleep of the terminal is not limited to the sleep of communication when there is no data to be communicated, and may be read as, for example, the sleep of CPU operations.

<S206>

The terminal obtains position information on the terminal in the first transmission (e.g., PUSCH transmission) after waking up from sleep. When the position of the satellite has changed, the terminal uses the changed position information on the satellite. Then, the terminal updates $TA_{location}$, adjusts the timing, and transmits PUSCH. Note that the terminal sets (resets or clears) $TA_{path}$ to zero.

<S207>

The terminal may indicate the timing information (e.g., TA value) to the base station because it is likely that the position of the satellite or the terminal has changed after waking up from sleep. Further, whether to indicate the timing information to the base station may be specified (indicated in the SIB) by the base station depending on the type of the satellite (geostationary satellite, non-geostationary satellite) or may be configured for each terminal depending on the moving speed and/or the type of the terminal, or each terminal may indicate the timing information.

<S208 and S209>

Similarly to S204 and S205, the terminal updates $TA_{path}$ by path tracking. Note that the terminal need not update $TA_{location}$ at this time.

As in the sequence chart described above, the terminal performs two timing adjustments: a timing adjustment with relatively fine granularity and a timing adjustment with relatively coarse granularity. Further, the terminal performs different timing adjustments in accordance with the channel and/or the signal to be transmitted. In addition, the terminal determines $TA_{path}$ by path tracking and performs the timing adjustment using the timing adjustment value including $TA_{path}$.

The example has been described in which the terminal sleeps in S206 and the terminal wakes up in S207, but the present disclosure is not limited thereto. For example, the present disclosure is similarly applied to a case of recovery from an IDLE or INACTIVE state or recovery from the expiration of TA timer. The TA timer may be a timeAlignmentTimer described in TS38.321 V15.8.0.

Note that, similarly to Embodiment 1, $K_{offset,cell}$, $K_{adj,UE}$, or TA command 2 (coarse TA) may be used in the above-described sequence chart or need not be used, or a pre-determined value may be used. The base station may explicitly indicate invalidation or may indicate a pre-determined value.

As described above, in Embodiment 2, performing timing control with coarse granularity in addition to timing control with fine granularity can suppress an increase in indication overhead, and can realize transmission timing control of the terminal suitable for the environment of the satellite communication in which the propagation delay is long and the difference in the propagation delay between terminals is large. Further, in Embodiment 2, appropriate transmission timing control of the terminal is possible by using a timing adjustment value by path tracking in the timing control.

In the case of the timing adjustment with the position information (e.g., GNSS/ephemeris position information) on the terminal and the satellite, an error occurs to the actual propagation path in a non-line-of-sight environment (e.g., an environment in which there is no directed wave and a reflected wave or a diffracted wave arrives). This error can be corrected by a TA command transmitted from the base station, but when the timing adjustment with the GNSS/ephemeris position information is restarted every time the position of the terminal or the satellite changes, the error occurs again, and the correction by the TA command is restarted.

Then, correction using path tracking without frequently performing a timing adjustment using the GNSS/ephemeris position information can maintain the accuracy of the timing adjustment and avoid frequent TA command transmission from the base station. In addition to the enhancement of the accuracy of the timing adjustment, overhead can be reduced. Furthermore, it is likely that the path tracking has not been performed in a case where no signal has been received for a long time, such as in a sleep state, or a case of the first transmission after some functions are stopped; therefore, performing a timing adjustment using GNSS/ephemeris position information can maintain a certain degree of timing accuracy.

Embodiment 3

The configuration of the terminal and the base station according to the present embodiment may be the same as that of terminal 100 and base station 200 described in Embodiment 1. However, the operation relating to the timing adjustment of terminal 100 and base station 200 described in Embodiment 1 changes.

In the present embodiment, in addition to TA, the timing is adjusted with "Koffset" that defines transmission-slot timing.

For example, in terminal 100 illustrated in FIG. 4, controller 109 controls uplink transmission timing (e.g., transmission-slot timing) using one of the first offset (e.g., $K_{offset,cell}$) and the second offset (e.g., $K_{offset,UE}$) that is shorter than the first offset, based on the information on a control signal (e.g., DCI or PDCCH) for scheduling. Radio transmitter 105 performs uplink transmission based on the control of uplink transmission timing.

Further, for example, in base station 200 illustrated in FIG. 5, controller 209 controls uplink reception timing (e.g., reception-slot timing) using one of the first offset (e.g., $K_{offset,cell}$) and the second offset (e.g., $K_{offset,UE}$) that is shorter than the first offset, based on the information on a control signal (e.g., DCI or PDCCH) for scheduling. Radio receiver 202 performs uplink reception based on the control of the uplink reception timing.

In the Koffset, for example, "$K_{offset,cell}$", which is a cell-specific value, or "$K_{offset,UE}$", which is a terminal-specific (hereinafter, referred to as UE-specific) value, may be configured. For example, UE-specific $K_{offset,UE}$ is shorter than cell-specific $K_{offset,cell}$.

For example, cell-specific $K_{offset,cell}$ may be indicated to terminal 100 by SIB. Terminal 100 may use cell-specific $K_{offset,cell}$ (e.g., Koffset=$K_{offset,cell}$) to determine a transmission slot of PUSCH or PUCCH, such as transmission until UE-specific $K_{offset,UE}$ is indicated (e.g., PUSCH for MSG3 at the initial access) or transmission of ACK/NACK (e.g., also referred to as HARQ-feedback) to PDSCH for MSG4. In addition, after UE-specific $K_{offset,UE}$ is indicated, terminal 100 may use $K_{offset,UE}$ to determine a transmission slot of PUSCH or PUCCH (e.g., Koffset=$K_{offset,UE}$).

Further, for example, UE-specific $K_{offset,UE}$ may be indicated to terminal 100 by at least one of a UE-specific RRC message, MAC CE, and/or DCI. Further, as the information on UE-specific $K_{offset,UE}$, a relative value (or difference) from $K_{offset,UE}$ and/or a relative value (or difference) from the value of previously indicated $K_{offset,UE}$ may be indicated to terminal 100.

Further, similarly to Embodiment 1, UE-specific $K_{offset,UE}$ may be appropriately updated in accordance with the movement of at least one of the satellite and/or the terminal. For example, because the satellite is stationary in the case of GEO, UE-specific $K_{offset,UE}$ may be updated in accordance with the movement of terminal 100. In this case, because the frequency of updates of UE-specific $K_{offset,UE}$ is relatively small, the indication by an RRC message is suitable. On the other hand, for example, in the case of LEO, UE-specific $K_{offset,UE}$ may be updated in accordance with the high-speed movement of the satellite. In this case, because the frequency of updates of UE-specific $K_{offset,UE}$ is relatively high, MAC CE or DCI, which can indicate and reflect UE-specific $K_{offset,UE}$ for a shorter time than the RRC message, may indicate a relative value (e.g., difference) to terminal 100. For example, indication of the relative value of UE-specific $K_{offset,UE}$ reduces the amount of indication information, and thus Koffset can be indicated more quickly.

Further, in a case of indication of UE-specific $K_{offset,UE}$ by DCI, DCI common to the group (e.g., DCI format 2_0 or the like) may be used in addition to DCI for each terminal.

Here, in the case of indication for each terminal, there is a possibility in that understanding of the $K_{offset,UE}$ value is different between base station 200 and terminal 100 due to the reception error of the indication information or the error of an ACK/NACK signal for the indication information. For example, when a relative value (or a difference) is indicated as indication information on $K_{offset,UE}$, the difference for the previous value in which misunderstanding may have occurred between base station 200 and terminal 100 is indicated to terminal 100, and thus it is difficult to match the understanding between base station 200 and terminal 100.

Therefore, in the present embodiment, terminal 100 and base station 200 control uplink transmission and reception timing using either cell-specific $K_{offset,cell}$ or UE-specific $K_{offset,UE}$ based on the information on DCI (or PDCCH) for scheduling, for example. For example, in a case where the scheduling is performed by a particular method or a particular DCI, terminal 100 and base station 200 use cell-specific $K_{offset,cell}$ rather than UE-specific $K_{offset,UE}$ even when UE-specific $K_{offset,UE}$ is indicated to terminal 100.

An example of timing control using the above-described transmission-slot timing (or timing adjustment value) will be described.

Figure 13:
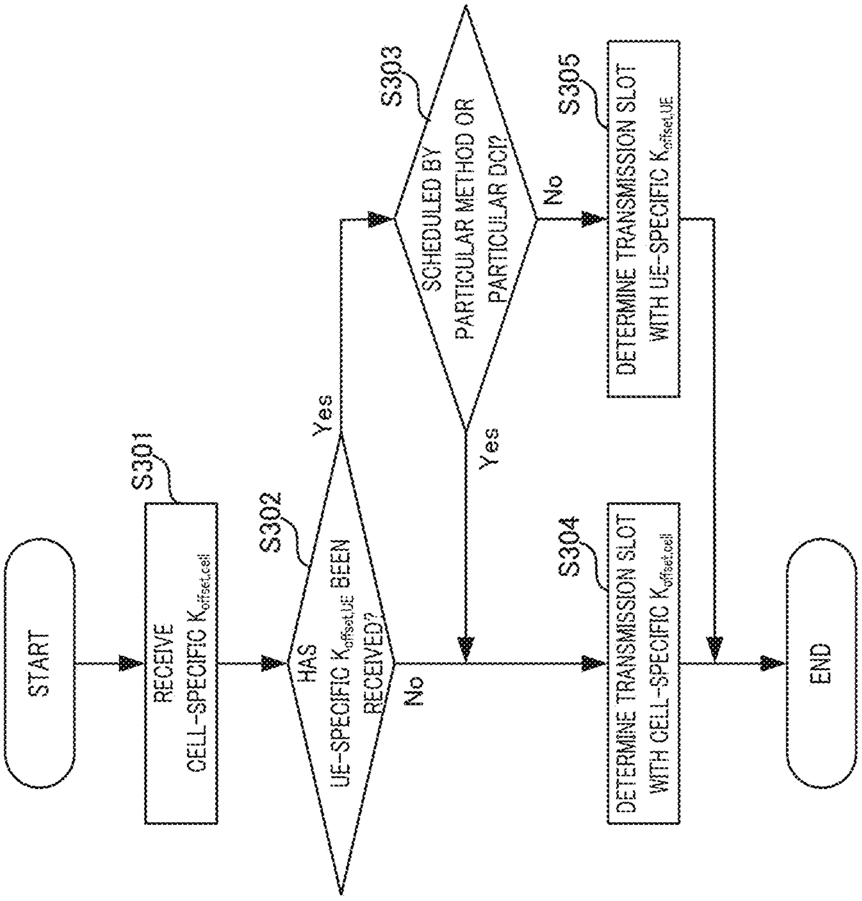
FIG. 13 is an exemplary flow chart of timing control in Embodiment 3.

FIG. 13 is an exemplary flow chart of transmission-slot timing control of an uplink signal (e.g., PUSCH or PUCCH) in terminal 100 according to the present embodiment. Each processing of step 301 (S301) to S305 will be described below with reference to FIG. 13.

<S301>

Terminal 100 receives, for example, cell-specific $K_{offset,cell}$. Cell-specific $K_{offset,cell}$ may be included in SIB, for example.

<S302>

Terminal 100 determines, for example, whether UE-specific $K_{offset,UE}$ has been received. For example, UE-specific $K_{offset,UE}$ may be indicated from base station 200 to terminal 100 at the timing of PDSCH (msg4) reception (a process of S105) or PDSCH reception (S109) illustrated in FIG. 8. Further, for example, in a case of transmission and reception at the time of initial access or a case where a cell size is small (a case where a cell size is less than a threshold value), there may be a case where data is scheduled without UE-specific $K_{offset,UE}$ being configured (in other words, indicated) by base station 200 (e.g., a case where DCI of uplink or downlink data allocation is received).

<S303>

When UE-specific $K_{offset,UE}$ is received (S302: Yes), terminal 100, for example, determines whether transmission of PUSCH or PUCCH has been scheduled by a particular method or a particular DCI. The particular method and the particular DCI will be described later.

<S304, S305>

When no UE-specific $K_{offset,UE}$ is received (S302: No) or when transmission of a PUSCH or PUCCH is scheduled by the particular method or the particular DCI (S303: Yes), terminal 100 determines a transmission slot based on cell-specific $K_{offset,cell}$, for example.

On the other hand, when UE-specific $K_{offset,UE}$ is received (S302: Yes) and transmission of PUSCH or PUCCH is not scheduled by the particular method or the particular DCI (S303: No), terminal 100 determines a transmission slot based on UE-specific $K_{offset,UE}$, for example.

As described above with the flow chart, even though terminal 100 receives UE-specific $K_{offset,UE}$, terminal 100 determines a transmission slot based on cell-specific $K_{offset,cell}$ when the scheduling is performed by a particular method or a particular DCI.

Methods 1 to 5 will herein be described as examples of the particular method and the particular DCI.

<Method 1>

In Method 1, for example, the offset Koffset used for determination of a transmission slot is determined based on a format of DCI (DCI format). For example, terminal 100 uses cell-specific $K_{offset,cell}$ when the format of DCI for scheduling is DCI format 0_0 or DCI format 1_0. In other words, in Method 1, the particular DCI is DCI format 0_0 and DCI format 1_0, for example.

Note that the particular DCI format such as DCI format 0_0 or DCI format 1_0 may be a DCI format in which Multiple-Input Multiple-Output (MIMO) is not supported, a DCI format in which the indication of resource allocation is limited, such as a case where the indication is limited to consecutive resource blocks, a DCI format used for cell-common scheduling PDSCH, or a DCI format whose number of bits is small (e.g., the number of bits is less than a threshold value). Such DCI may be used, for example, for transmission with lower number of bits or transmission with lower overhead.

On the other hand, a DCI format such as DCI format 0_1, DCI format 0_2, DCI format 1_1, or DCI format 1_2, which is different from the particular DCI described above, can indicate scheduling information with more flexibility and less limitation, and may be a DCI format for high-speed data communication or high-reliability low-latency data communication, for example.

For example, when scheduling is performed by DCI format 0_0 or DCI format 1_0, terminal 100 determines a transmission slot based on cell-specific $K_{offset,cell}$. On the other hand, for example, when scheduling is performed by DCI format 0_1, DCI format 0_2, DCI format 1_1, or DCI format 1_2, terminal 100 determines a transmission slot based on UE-specific $K_{offset,UE}$.

For example, for PUSCH, terminal 100 may determine a transmission slot of PUSCH scheduled by DCI format 0_0 by slot $n+K_2+K_{offset,cell}$, and may determine a transmission slot of PUSCH scheduled by DCI format 0_1 or DCI format 0_2 by slot $n+K_2+K_{offset,UE}$. In this case, slot n is the slot number to which DCI has been indicated.

For example, for PDSCH, terminal 100 may determine a transmission slot of HARQ-feedback (or ACK/NACK) for PDSCH scheduled by DCI format 1_0 by slot $n'+K_1+K_{offset,cell}$, and may determine a transmission slot of HARQ-feedback (or ACK/NACK) to PDSCH scheduled by DCI format 1_1 or DCI format 1_2 by slot $n'+K_1+K_{offset,UE}$. In this case, slot n' is the slot number to which PDSCH has been transmitted.

This determination of transmission slot allows terminal 100 to continue communication based on cell-specific $K_{offset,cell}$ even when there is a misunderstanding of a value of UE-specific $K_{offset,UE}$ between base station 200 and terminal 100.

Further, for example, base station 200 may determine that there is a misunderstanding between base station 200 and terminal 100 when base station 100 detects no PUSCH or HARQ-feedback (e.g., PUCCH) from terminal 100 for a predetermined period, and may communicate with terminal 100 based on DCI format 0_0 or DCI format 1_0 (in other words, cell-specific $K_{offset,cell}$).

For example, base station 200 may match the understanding of the $K_{offset,UE}$ value between base station 200 and terminal 100 by indicating the UE-specific $K_{offset,UE}$ value to terminal 100 again by the communication using DCI format 0_0 or DCI format 1_0. For example, when the indication of $K_{offset,UE}$ is performed by an RRC message, terminal 100 and base station 200 may reset the accumulated value of the difference information indicated previously by MAC CE or DCI. This allows base station 200 and terminal 100 to match the understanding of the $K_{offset,UE}$ value with each other.

For example, for the indication of $K_{offset,UE}$ to match the understanding between terminal 100 and base station 200, communication based on cell-specific $K_{offset,cell}$ using DCI format 0_0 or 1_0 is sufficient. Further, in a case where there is no misunderstanding (e.g., a normal case), terminal 100 can perform transmission with UE-specific $K_{offset,UE}$ having a shorter delay by using DCI format 0_1, 0_2, 1_1, 1_2, or the like, which are capable of more flexible scheduling.

<Method 2>

In Method 2, for example, the offset Koffset used for determination of a transmission slot is determined based on a type of Search Space (SS) used for scheduling (e.g., transmission of DCI). For example, terminal 100 uses cell-specific $K_{offset,cell}$ when a search space used for transmitting DCI for scheduling is a search space common to a plurality of terminals (common search space). In other words, in Method 2, a particular method is, for example, a method in which DCI (or PDCCH) including scheduling information is transmitted in a common search space.

For example, when scheduling is performed by DCI (or PDCCH) transmitted in a common search space, terminal 100 determines a transmission slot based on cell-specific $K_{offset,cell}$. On the other hand, for example, when scheduling is performed by DCI (or PDCCH) transmitted in a UE-specific search space (UE specific search space), terminal 100 determines a transmission slot based on UE-specific $K_{offset,UE}$.

For example, for PUSCH, terminal 100 may determine a transmission slot of PUSCH scheduled by DCI transmitted in a common search space by slot $n+K_2+K_{offset,cell}$, and may determine a transmission slot of PUSCH scheduled by DCI transmitted in a UE-specific search space by slot $n+K_2+K_{offset,UE}$. In this case, slot n is the slot number to which DCI has been indicated.

For example, for PDSCH, terminal 100 may determine a transmission slot of HARQ-feedback (or ACK/NACK) for PDSCH scheduled by DCI transmitted in a common search space by slot $n'+K_1+K_{offset,cell}$, and may determine a transmission slot of HARQ-feedback (or ACK/NACK) for PDSCH scheduled by DCI transmitted in a UE-specific search space by slot $n'+K_1+K_{offset,UE}$. In this case, slot n' is the slot number to which PDSCH has been transmitted.

This determination of transmission slot allows terminal 100 to continue communication based on cell-specific $K_{offset,cell}$ even when there is a misunderstanding of a value of UE-specific $K_{offset,UE}$ between base station 200 and terminal 100. In this case, in normal communication, DCI for terminal 100 for scheduling may be indicated to terminal 100 in a UE-specific search space including a larger number of candidates for the number of Control Channel Elements (CCEs) or a larger number of blind decodes (e.g., a larger number of resource candidates for mapping DCI). On the other hand, when there is a misunderstanding of a value of UE-specific $K_{offset,UE}$, DCI for scheduling is indicated to terminal 100 in a common search space including a smaller number of candidates for the number of CCEs or a smaller number of blind decodes (e.g., the smaller number of resource candidates for mapping DCI), so that the range of resource candidates usable for the indication of the scheduling information in the normal communication is not narrowed, which can reduce the limitation on the scheduling as much as possible.

Further, for example, base station 200 may determine that there is a misunderstanding between base station 200 and terminal 100 when base station 100 detects no PUSCH or HARQ-feedback (e.g., PUCCH) from terminal 100 for a predetermined period, and may communicate with terminal 100 by transmitting DCI with a common search space (in other words, cell-specific $K_{offset,cell}$). For example, base station 200 may indicate a value of UE-specific $K_{offset,UE}$ to terminal 100 again by the communication using a common search space, and may match the understanding of the $K_{offset,UE}$ value between base station 200 and terminal 100.

<Method 3>

In Method 3, for example, the offset Koffset used for determination of a transmission slot is determined based on a resource for control channel transmission (e.g., CORESET: Control Resource Set) used for scheduling (e.g., transmission of DCI). For example, terminal 100 uses cell-specific $K_{offset,cell}$ when CORESET used for transmitting DCI for scheduling is a particular CORESET. In other words, in Method 3, a particular method is, for example, a method in which DCI (or PDCCH) including scheduling information is transmitted in a particular CORESET.

For example, the particular CORESET may be CORESET 0. For example, a resource of CORESET 0 may be a resource broadcast by SIB and common to a plurality of terminals in a cell. For example, CORESET different from CORESET 0 may be a resource configured for each terminal. Note that the particular CORESET number is not limited to 0. Further, the number of particular CORESETs is not limited to one.

For example, when scheduling is performed by DCI (or PDCCH) transmitted in CORESET 0, terminal 100 determines a transmission slot based on cell-specific $K_{offset,cell}$. On the other hand, for example, when scheduling is performed by DCI (or PDCCH) transmitted in CORESET different from CORESET 0, terminal 100 determines a transmission slot based on UE-specific $K_{offset,UE}$.

For example, for PUSCH, terminal 100 may determine a transmission slot of PUSCH scheduled by DCI transmitted in CORESET 0 by slot $n+K_2+K_{offset,cell}$, and may determine a transmission slot of PUSCH scheduled by DCI transmitted in CORESET different from CORESET 0 by slot $n+K_2+K_{offset,UE}$. In this case, slot n is the slot number to which DCI has been indicated.

For example, for PDSCH, terminal 100 may determine a transmission slot of HARQ-feedback (or ACK/NACK) for PDSCH scheduled by DCI transmitted in CORESET 0 by slot $n'+K_1+K_{offset,UE}$, and may determine a transmission slot of HARQ-feedback (or ACK/NACK) for PDSCH scheduled by DCI transmitted in CORESET different from CORESET 0 by slot $n'+K_1+K_{offset,UE}$. In this case, slot n' is the slot number to which PDSCH has been transmitted.

This determination of transmission slot allows terminal 100 to continue communication based on cell-specific $K_{offset,cell}$ even when there is a misunderstanding of a value of UE-specific $K_{offset,UE}$ between base station 200 and terminal 100. In this case, in a normal condition, DCI for scheduling for terminal 100 may be indicated to terminal 100 in UE-specific CORESET (in this case, CORESET different from CORESET 0) that can configure a resource more flexibly. On the other hand, when there is a misunderstanding of a value of UE-specific $K_{offset,UE}$, DCI for scheduling is indicated to terminal 100 in CORESET 0 (e.g., CORESET common to a plurality of terminals), so that the range of resources usable for the indication of the scheduling information in the normal condition is not reduced, which can reduce the influence with the indication of the scheduling information in the normal condition.

Further, for example, base station 200 may determine that there is a misunderstanding between base station 200 and terminal 100 when base station 100 detects no PUSCH or HARQ-feedback (e.g., PUCCH) from terminal 100 for a predetermined period, and may communicate with terminal 100 by transmitting DCI with CORESET 0 (in other words, cell-specific $K_{offset,cell}$). For example, base station 200 may indicate a value of UE-specific $K_{offset,UE}$ to terminal 100 again by the communication using CORESET 0, and may match the understanding of the $K_{offset,UE}$ value between base station 200 and terminal 100.

<Method 4>

In Method 4, for example, the offset Koffset used for determination of a transmission slot is determined based on a scheduling method. For example, terminal 100 uses cell-specific $K_{offset,cell}$ when the scheduling method by DCI (or PDCCH) for scheduling is Semi-persistent scheduling (SPS). In other words, in Method 4, the particular scheduling method is SPS, for example.

For example, terminal 100 may determine a transmission slot of HARQ-feedback (or ACK/NACK) for PDSCH scheduled by SPS by slot $n'+K_1+K_{offset,cell}$, and may determine a transmission slot of HARQ-feedback (or ACK/NACK) for PDSCH scheduled by a method different from SPS by slot $n'+K_1+K_{offset,UE}$. In this case, slot n' is the slot number to which PDSCH has been transmitted.

This determination of transmission slot allows terminal 100 to continue communication based on cell-specific $K_{offset,cell}$ even when there is a misunderstanding of a value of UE-specific $K_{offset,UE}$ between base station 200 and terminal 100.

For example, as UE-specific $K_{offset,UE}$ is updated more frequently corresponding to the LEO satellite, the overhead increases. In this case, the SPS can perform transmission with reduced overhead of PDCCH for a periodic traffic or small-amount data transmission. Therefore, according to Method 4, using cell-specific $K_{offset,cell}$ for HARQ-feedback for PDSCH scheduled by SPS instead of UE-specific $K_{offset,UE}$ eliminates the need of frequent updates of UE-specific $K_{offset,UE}$, and thus the overhead can be reduced.

<Method 5>

In Method 5, for example, the offset Koffset used for determination of a transmission slot is determined based on HARQ process (re-transmission process) allocated to PUSCH or PDSCH. For example, terminal 100 selects either cell-specific $K_{offset,cell}$ or UE-specific $K_{offset,UE}$ in accordance with the HARQ process number indicated by DCI for scheduling. In Method 5, for example, the particular method is a method in which PUSCH or PUCCH is transmitted with being allocated to a particular HARQ process.

For example, the particular HARQ process is a HARQ process with HARQ process number 0. The particular HARQ process may be, for example, a HARQ process (e.g., including HARQ process number 0) allocated in SPS described in Method 3. Note that the HARQ process number may be indicated to terminal 100 by DCI, for example. For example, when the HARQ process number is 0, terminal 100 selects cell-specific $K_{offset,cell}$.

For example, when HARQ process number 0 is allocated, terminal 100 determines a transmission slot based on cell-specific $K_{offset,cell}$. On the other hand, for example, when a HARQ process number different from HARQ process number 0 is allocated, terminal 100 determines a transmission slot based on UE-specific $K_{offset,UE}$.

For example, for PUSCH, terminal 100 may determine a transmission slot of PUSCH to which HARQ process number 0 is allocated by slot $n'+K_2+K_{offset,cell}$, and may determine a transmission slot of PUSCH to which a HARQ process number different from HARQ process number 0 is allocated by slot $n'+K_2+K_{offset,UE}$. In this case, slot n' is the slot number in which DCI has been transmitted.

Further, for example, for PDSCH, terminal 100 may determine a transmission slot of HARQ-feedback (or ACK/NACK) for PDSCH to which HARQ process number 0 is allocated by slot $n'+K_1+K_{offset,cell}$, and may determine a transmission slot of HARQ-feedback (or ACK/NACK) for PUSCH to which a HARQ process number different from HARQ process number 0 is allocated by slot $n'+K_1+K_{offset,UE}$. In this case, slot n' is the slot number to which PDSCH has been transmitted.

This determination of transmission slot allows terminal 100 to continue communication based on cell-specific $K_{offset,cell}$ even when there is a misunderstanding of a value of UE-specific $K_{offset,UE}$ between base station 200 and terminal 100. For example, base station 200 may continue communication with terminal 100 by scheduling using HARQ process number 0.

Further, for example, base station 200 may indicate a value of UE-specific $K_{offset,UE}$ to terminal 100 again by the communication using HARQ process number 0 (in other words, cell-specific $K_{offset,cell}$), and may match the understanding between base station 200 and terminal 100.

Methods 1 to 5 have been described above. At least two of Methods 1 to 5 may be combined. As an example, terminal 100 may use either cell-specific $K_{offset,cell}$ or UE-specific $K_{offset,UE}$ based on a combination of a DCI format (Method 1) and a search space used for transmitting DCI for scheduling. For example, terminal 100 may use cell-specific $K_{offset,cell}$ when scheduling is performed by DCI format 0_0 or 1_0 using a common search space, and may use UE-specific $K_{offset,UE}$ in another case. The same applies to another combination of Methods 1 to 5.

Further, base station 200 may indicate whether cell-specific $K_{offset,cell}$ or UE-specific $K_{offset,UE}$ to be used in DCI for data scheduling.

As described above, according to the present embodiment, terminal 100 controls uplink transmission timing using either cell-specific $K_{offset,cell}$ or UE-specific $K_{offset,UE}$ based on the information on DCI for scheduling (e.g., a particular DCI or a particular method). Thus, for example, in a case where the understanding of transmission-slot timing individual for a terminal is different between terminal 100 and base station 200, the communication between terminal 100 and base station 200 can be continued based on the transmission-slot timing using cell-specific $K_{offset,cell}$ even when UE-specific $K_{offset,UE}$ has been indicated to terminal 100. Therefore, according to the present embodiment, appropriate timing control in accordance with a propagation delay between terminal 100 and base station 200 can be realized. Note that the same effect can be obtained by controlling uplink transmission timing using one of cell-specific $K_{offset,cell}$ and UE-specific $K_{offset,UE}$ based on the information on PDCCH for scheduling (e.g., a particular PDCCH or a particular method).

Further, DCI whose content does not change depending on the configuration of each terminal, such as DCI format 0_0 or DCI format 1_0, may be called as Fallback DCI. When scheduling is performed by Fallback DCI, cell-specific $K_{offset,cell}$ may be used, and UE-specific $K_{offset,UE}$ may be used in another case.

Embodiment 4

The configuration of the terminal and the base station according to the present embodiment may be the same as that of terminal 100 and base station 200 described in Embodiment 1. However, the operation relating to a timing adjustment of terminal 100 and base station 200 described in Embodiment 1 changes. For example, similarly to Embodiment 3, terminal 100 and base station 200 may perform timing adjustment by "Koffset" that defines a transmission-slot timing.

Further, in the present embodiment, for example, a HARQ process in which HARQ-feedback is enabled or a HARQ process in which HARQ-feedback is disabled is used for data transmission.

The information on the enabling and disabling of HARQ-feedback may be indicated from base station 200 to terminal 100 as information individual for a HARQ process, for example.

Terminal 100, for example, transmits HARQ-feedback (e.g., ACK/NACK) to PDSCH (or transport block) of the HARQ process in which HARQ-feedback is enabled, and does not transmit HARQ-feedback to PDSCH (or transport block) of the HARQ process in which HARQ-feedback is disabled.

Hereinafter, Koffset indication method 1 and indication method 2 according to the present embodiment will be described.

<Koffset Indication Method 1>

In Indication Method 1, for example, a HARQ process in which HARQ-feedback is enabled is allocated to PDSCH used for indication of Koffset (e.g., $K_{offset,UE}$, $K_{offset,adj}$, or Coarse TA). For example, terminal 100 may receive information on Koffset by a re-transmission process in which HARQ-feedback is enabled. In other words, terminal 100 does not receive information on Koffset by a re-transmission process in which HARQ-feedback is disabled.

Further, terminal 100 may reflect the received Koffset value at a predetermined timing, for example. For example, when Koffset is indicated by MAC CE, terminal 100 may reflect Koffset after three slots (or after X slots) from HARQ-ACK transmission timing to PDSCH including MAC CE. Further, for example, when Koffset is indicated by RRC signaling, terminal 100 may reflect Koffset after 10 ms from the slot in which PDSCH is received.

For example, in response to the indication of Koffset, base station 200 can estimate whether terminal 100 has correctly received MAC CE by receiving HARQ-feedback signal transmitted from terminal 100. This can reduce the possibility in that the understanding of the Koffset value is different between base station 200 and terminal 100.

In addition, because the reflection timing of Koffset after terminal 100 receives Koffset is defined uniquely, the understanding of Koffset can match between base station 200 and terminal 100 when terminal 100 correctly receive Koffset.

<Koffset Indication Method 2>

In Indication Method 2, for example, either a HARQ process in which HARQ-feedback is enabled or a HARQ process in which HARQ-feedback is disabled may be allocated to PDSCH used for indication of Koffset (e.g., $K_{offset,UE}$, $K_{offset,adj}$, or Coarse TA). For example, terminal 100 may receive information on Koffset with either a re-transmission process in which HARQ-feedback is enabled or a re-transmission process in which HARQ-feedback is disabled.

For example, when base station 200 uses a HARQ process in which HARQ-feedback is disabled, base station 200 may attempt to reduce the probability of occurrence of the misunderstanding of transmission timing between base station 200 and terminal 100 caused by a Koffset indication error, by transmitting a low targeting error rate (BLER: Block Error Rate), such as use of low MCS or Repetition transmission.

Further, in Indication Method 2, similarly to Notification Method 1, terminal 100 may reflect the received Koffset value at a predetermined timing, for example. For example, when Koffset is indicated by MAC CE, terminal 100 may reflect Koffset after three slots (or after the X slots) from HARQ-ACK transmission timing to PDSCH including MAC CE.

On the other hand, when a HARQ process in which HARQ-feedback is disabled is used, no HARQ-ACK is transmitted. In this case, terminal 100 may reflect Koffset after three slots (or after X slots) from the timing at which HARQ-ACK is not actually transmitted but assumed to be transmitted (e.g., referred to as virtual HARQ-ACK timing).

Further, HARQ-ACK transmission timing is determined based on, for example, a value of $K_1$ (an offset value from PDSCH slot) indicated from DCI at the time of PDSCH scheduling. For example, when a HARQ process in which HARQ-feedback is disabled is used, terminal 100 does not actually transmit HARQ-ACK, but may determine virtual HARQ-ACK timing based on the indicated $K_1$ value.

Further, when HARQ-feedback is disabled, the $K_1$ value is originally unnecessary, and thus there is a possibility in that the $K_1$ value is not indicated by DCI, is used for another use, or is treated as a disabled field. In these cases, any (e.g., the smallest value or the largest value) of the values configured as $K_1$ value candidates may be used for the determination of the virtual HARQ-ACK timing. Alternatively, the $K_1$ value used when HARQ-feedback is disabled may be configured, or a default value for the $K_1$ value may be specified in the specification.

By Indication Method 2, for example, because the reflection timing of Koffset is uniquely defined regardless of the enabling and disabling of HARQ-feedback, it is possible to match the understanding of Koffset between base station 200 and terminal 100 when the Koffset value is correctly received in terminal 100.

Koffset Indication Method 1 and indication Method 2 have been described above.

Note that, in Embodiment 3 and Embodiment 4, UE-specific $K_{offset,UE}$ may be calculated by $K_{offset,cell}-K_{adj,UE}$ using $K_{adj,UE}$ which is an adjustment value described in Embodiment 1 and Embodiment 2, for example. Further, UE-specific $K_{offset,UE}$ may be calculated by $K_{offset,cell}-TA_{coarse}$ using a coarse TA value (e.g., Coarse TA), for example. $K_{adj,UE}$ or the coarse TA value may be indicated to terminal 100 by at least one of an RRC message, MAC CE, or DCI, for example.

In addition, when Koffset is indicated by Group common DCI in which information for a plurality of terminals, such as DCI format 2_x, is included in one piece of DCI, terminal 100 may reflect Koffset after three slots (or x slot) from the slot in which DCI has been received. Terminal 100 may transmit a HARA-ACK signal to base station 200 when terminal 100 receives DCI in which information on $K_{offset,UE}$ is included in order to reduce the occurrence of misunderstanding of $K_{offset,UE}$ as much as possible.

Also, for example, even when UE-specific $K_{offset,UE}$ is indicated to terminal 100, cell-specific $K_{offset,cell}$ may be used for HARQ-feedback for PDSCH scheduled by DCI of Random Access-Radio Network Temporary Identifier (RA-RNTI). That is, RNTI of DCI used for scheduling may determine to use either cell-specific $K_{offset,cell}$ or UE-specific $K_{offset,UE}$. For example, cell-specific $K_{offset,cell}$ may be used for HARQ-feedback for PDSCH scheduled by DCI of RNTI other than C-RNTI, which is a UE-specific ID.

Also, for example, even when UE-specific $K_{offset,UE}$ is indicated to terminal 100, cell-specific $K_{offset,cell}$ may be used for PUSCH scheduled by a UL grant for Msg3 indicated by RACH response (MSG2).

Further, for example, cell-specific $K_{offset,cell}$ may be a Koffset value specific to a satellite beam, or may be Koffset specific to an SSB beam specified by 3GPP.

Furthermore, cell-specific $K_{offset,cell}$ may be a Koffset value reported by SIB. In addition, UE-specific $K_{offset,UE}$ may be a Koffset value indicated by an RRC reconfiguration message for each terminal, or may be a Koffset value indicated by MAC CE or DCI.

Also, for example, a case where an offset value (e.g., $K_{offset,cell}$+K1, $K_{offset,cell}$+K2, or $K_{offset,UE}$+K1, $K_{offset,UE}$+K2 (slot length is multiplied for time conversion)) for determining a transmission slot of PUSCH or PUCCH (HARQ-feedback) is smaller than a TA value (time-converted TA value) configured to terminal 100 means that the transmission slot of PUSCH or PUCCH is earlier than the reception slot of DCI or PDSCH. In this case, terminal 100 need not transmit PUSCH or PUCCH. Further, in this case, terminal 100 may initiate a procedure of a radio link failure (Radio Link Failure (RLF) procedure) or a procedure of a beam failure (Beam Failure or Beam Recovery), for example. Furthermore, RACH may be transmitted for re-synchronization.

Further, HARQ-feedback may also be referred to as HARQ-ACK or ACK/NACK.

Embodiments of the present disclosure have been described above.

Note that, in the above-described embodiments, the NTN environment (e.g., the environment of satellite communication) is exemplified, but the present disclosure is not limited to thereto. The present disclosure may be applied to another communication environment (e.g., LTE and/or NR terrestrial cellular environments).

Note that, in the above-described embodiments, the example has been described in which GNSS such as GPS (that is, position detection using a satellite signal) is used, but position detection by a terrestrial-cellular base station, position detection using a WiFi signal and/or a Bluetooth (registered trademark) signal, position detection using an acceleration sensor or the like, or any combination of the above position detection may be performed. Further, the position information may include information on altitude in addition to latitude and longitude. Furthermore, the position information may be a value of a separately defined coordinate system. The altitude information may be obtained from an atmospheric pressure sensor or the like.

In the above-described embodiments, the terminal indicates at least one of a TA value and/or position information to the base station, but the indication timing (indication trigger) may be different from that of the above-described embodiments. For example, the indication trigger may be based on another indication, such as a change in channel quality, instead of a TA value or a change in position. For example, Reference Signal Received Power (RSRP), Reference Signal Received Quality (RSRQ), Signal to Interference plus Noise. Ratio (SINR), or the like is used as the channel quality. The indicator to be used or the threshold value of the amount of change may be configured by the base station.

In addition, the base station may indicate which information, such as a TA value or position information, to notify.

Cell-specific TA offset, $K_{offset,cell}$, and the like may indicate a difference from a value indicated by a cell parameter (e.g., a value corresponding to an RTT around the center of the cell). Indication of the difference can reduce the amount of indication information.

In the above-described embodiments, TA command 1 for control with fine granularity may utilize a TA command of Rel15 NR without changing the granularity and range. Using the TA command without changing the granularity and range can reduce the amount of change in implementation between the terminal and the base station. Further, the granularity and range of TA command 2 may be indicated by SIB or the like from the base station. This can realize the indication of TA command 2 with the appropriate number of bits (e.g., a minimum number of bits) in accordance with the cell size, the height of the satellite, and the like, which can reduce the indication overhead. The same applies to the granularity and range of $K_{offset}$ and $K_{adj,UE}$.

TA command 1 may be represented by a relative value to TA command 1 transmitted at the previous transmission timing or a control value for the TA value transmitted at the previous transmission timing. In this case, a value obtained by accumulating the values of TA command 1 received until this time is used for $N_{TA}$ in Equation 1. Further, TA command 2 may be represented by a relative value to TA command 2 transmitted at the previous transmission timing or a control value for the TA value transmitted at the previous transmission timing. In this case, a value obtained by accumulating the values of TA command 2 received until this time is used for $M_{coarse}$ in Equation 2.

The cell-specific TA offset and/or $K_{offset,cell}$ may be a value for each beam associated with SSB. In this case, the amount of information to be indicated may be reduced by indicating the difference from the value indicated in cell units.

A signal and/or information broadcast from the base station may be transmitted by SSB and/or SIB, or may be transmitted using the method in which a plurality of terminals can receive, such as group-common DCI format (DCI format 2_x or the like). Further, when the same timing adjustment value is used for a plurality of terminals by correctively indicating TA command 1 and/or TA command 2 to a plurality of terminals, TA command 1 and/or TA command 2 may be transmitted by DCI format (DCI format 2_x or the like) common to the group.

Further, in each of the above-described embodiments, two timing adjustment values having different granularity and range are used, but the granularity and range may be the same or either one of granularity or range may be different between the two values. In addition, three or more types of timing adjustment values having different granularity and range may be used.

The timing adjustment based on GNSS/ephemeris position information or the timing adjustment by path tracking in the above-described embodiments is not based on a command from the base station, but the terminal autonomously performs the timing adjustment. The base station detects the reception timing for the reception signal from the terminal, but the accuracy of detecting reception timing may deteriorate when the reception timing greatly changes within the averaging window at the time of detection. Therefore, a minimum interval and/or a minimum width of the timing change may be defined for the timing adjustment performed autonomously by the terminal, and the terminal may be configured to change the value within the specified range. In addition, information on the minimum interval and/or the minimum change width may be indicated from the base station to the terminal.

Further, in the above-described embodiments, the terminal may perform a timing adjustment based on GNSS/ephemeris position information and timing adjustment by path tracking, using an indication from the base station as a trigger.

Further, the cell may be an area defined by the reception power of SSB and/or CSI-RS transmitted by the base station (or the satellite), or an area defined by a geographical location. Further, the cells of the above-described embodiments may be replaced with a beam defined by SSB.

Satellite ephemeris information, which is information on the position of the satellite, may be broadcast by system information or the like, or may be held in advance by the terminal (or the base station). Further, the terminal (or the base station) may update the Satellite ephemeris information when communication is possible. Furthermore, the terminal (or the base station) may identify the position of the satellite by using another information.

In addition, in the above-described embodiments, the case in which the position information can be used has been described, but on a terminal that does not have a GNSS function and/or a terminal that cannot obtain information on the position of the satellite, a timing adjustment in accordance with cell-common timing adjustment information broadcast from the base station may be performed instead of the timing adjustment based on the position information. In this case, the base station may transmit timing control information corresponding to the amount of the propagation delay around the center of the cell.

When PUSCH allocation by a Configured grant, that is, PUSCH allocation by DCI is not applied, the slot timing of PUSCH transmission is not adjusted for DCI reception timing; therefore, the terminal may transmit PUSCH without using TA command 2.

The application of the cell-specific TA offset, TA command 1, TA command 2, and indication of a TA value from the terminal is not limited to those described above.

When the system or the like that uses a plurality of cells, Component carriers or transmission/reception points includes a plurality of TA groups (TAG), the TA control may be performed on each TA group. In addition, some parameters such as a cell-specific TA offset may be shared. Further, Koffset may be configured for each TA group. Alternatively, because the difference in a delay between Component carriers (or Cells) is smaller than the slot length, the Koffset configured to PCell or SpCell may be used in another Component carrier or Cell (Scell). This can reduce the amount of indication information.

The timing adjustment value based on the position information has been described as a timing adjustment value with fine granularity. However, the timing adjustment value may be regarded as a timing adjustment value with coarse granularity in light of the accuracy of the position information or the like.

The base station may be referred to as a gNodeB or a gNB. Further, the terminal may be referred to as UE.

A Slot may be replaced with a time slot, a mini-slot, a frame, a subframe, or the like.

Further, Any component termed with "processor" or with a suffix, such as "-er," "-or," or "-ar" in the above-described embodiments may be replaced with other terms such as "circuit (circuitry)," "device," "unit," or "module."

Further, in the above-described embodiments, the radio wave propagation speed is described as approximately $3\times10^8$ [m/s], but the present disclosure is not limited thereto, and a value such as $2.99792\times10^8$ [m/s] may be used, for example. The accuracy of the wave propagation speed may depend on implementation.

(Control Signal)

In the present disclosure, the downlink control signal (or downlink control information) relating to the exemplary embodiment of the present disclosure may be a signal (or information) transmitted in a Physical Downlink Control Channel (PDCCH) of a physical layer, for example, or may be a signal (or information) transmitted in a Medium Access Control Control Element (MAC CE) or Radio Resource Control (RRC) in a higher layer. Further, the signal (or information) is not limited to that notified by the downlink control signal, but may be predefined in the specifications (or standard) or may be pre-configured for the base station and the terminal.

In the present disclosure, the uplink control signal (or uplink control information) relating to the exemplary embodiment of the present disclosure may be, for example, a signal (or information) transmitted in a PUCCH of the physical layer or a signal (or information) transmitted in the MAC CE or RRC of the higher layer. Further, the signal (or information) is not limited to that notified by the uplink control signal, and may be predefined in the specifications (or standard) or may be pre-configured for the base station and the terminal. The uplink control signal may be replaced with, for example, uplink control information (UCI), 1st stage sidelink control information (SCI), or 2nd stage SCI.

(Base Station)

In one exemplary embodiment of the present disclosure, the base station may be a Transmission Reception Point (TRP), a cluster head, an access point, a Remote Radio Head (RRH), an eNodeB (eNB), a gNodeB (gNB), a Base Station (BS), a Base Transceiver Station (BTS), a master device, a gateway, or the like. Further, in the sidelink communication, the base station may be replaced with a terminal. Alternatively, the base station may be replaced with a relay device that relays communication between a higher node and a terminal, or may be replaced with a roadside device.

(Uplink/Downlink/Sidelink)

One exemplary embodiment of the present disclosure may be applied to, for example, any of an uplink, a downlink, and a sidelink. For example, one exemplary embodiment of the present disclosure may be applied to a Physical Uplink Shared Channel (PUSCH), a Physical Uplink Control Channel (PUCCH), and a Physical Random Access Channel (PRACH) in the uplink, a Physical Downlink Shared Channel (PDSCH), PDCCH or a Physical Broadcast Channel (PBCH) in the downlink, or a Physical Sidelink Shared Channel (PSSCH), a Physical Sidelink Control Channel (PSCCH), a Physical Sidelink Broadcast Channel (PSBCH) in the sidelink.

Note that the PDCCH, PDSCH, PUSCH and PUCCH are one examples of a downlink control channel, a downlink data channel, an uplink data channel, and an uplink control channel, respectively. The PSCCH and PSSCH are one examples of a sidelink control channel and a sidelink data channel. Further, PBCH and PSBCH are broadcast channels, and PRACH is an exemplary random access channel.

(Data Channel/Control Channel)

One exemplary embodiment of the present disclosure may be applied to, for example, either of a data channel or a control channel. For example, a channel in one exemplary embodiment of the present disclosure may be replaced with any one of the PDSCH, PUSCH, and PSSCH being the data channels or the PDCCH, PUCCH, PBCH, PSCCH, and PSBCH being the control channels.

(Reference Signal)

In one exemplary embodiment of the present disclosure, a reference signal is a signal known to both of a base station and a mobile station, for example, and may also be referred to as a Reference Signal (RS) or a pilot signal. The reference signal may be any of a Demodulation Reference Signal (DMRS), a Channel State Information-Reference Signal (CSI-RS), a Tracking Reference Signal (TRS), a Phase Tracking Reference Signal (PTRS), a Cell-specific Reference Signal (CRS), or a Sounding Reference Signal (SRS).

(Time Interval)

In one exemplary embodiment of the present disclosure, the units of time resources are not limited to one or a combination of slots and symbols, but may be time resource units such as, for example, frames, superframes, subframes, slots, time slot subslots, minislots, or symbols, Orthogonal Frequency Division Multiplexing (OFDM) symbols, Single Carrier-Frequency Division Multiplexing (SC-FDMA) symbols, or other time resource units. The number of symbols included in one slot is not limited to the number of symbols exemplified in the above-described embodiments, and may be another number of symbols.

(Frequency Band)

One exemplary embodiment of the present disclosure may be applied to either a licensed band or an unlicensed band.

(Communication)

One exemplary embodiment of the present disclosure may be applied to any of communication between a base station and a terminal (Uu link communication), communication between a terminal and a terminal (Sidelink communication), and communication of a Vehicle to Everything (V2X). For example, the channel in one exemplary embodiment of the present disclosure may be replaced with the PSCCH, PSSCH, Physical Sidelink Feedback Channel (PSFCH), PSBCH, PDCCH, PUCCH, PDSCH, PUSCH, or PBCH.

In addition, one exemplary embodiment of the present disclosure may be applied to either of a terrestrial network or a network other than the terrestrial network using a satellite or a High Altitude Pseudo Satellite (HAPS) (Non-Terrestrial Network (NTN)). Further, one exemplary embodiment of the present disclosure may be applied to a terrestrial network having a larger transmission delay in comparison to a symbol length or a slot length, such as a network having a large cell size or an ultra-wideband transmission network.

(Antenna Port)

In one exemplary embodiment of the present disclosure, an antenna port refers to a logical antenna (antenna group) composed of one physical antennas or a plurality of physical antennas. For example, the antenna port does not necessarily refer to one physical antenna, and may refer to an array antenna including a plurality of antennas. For example, it is not defined how many physical antennas the antenna port is composed of, and the number of physical antennas may be defined as the smallest unit allowing a terminal station to transmit a Reference signal. Also, the antenna port may be defined as the smallest unit multiplied by a weight of a precoding vector.

<5G NR System Architecture and Protocol Stack>

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 14:
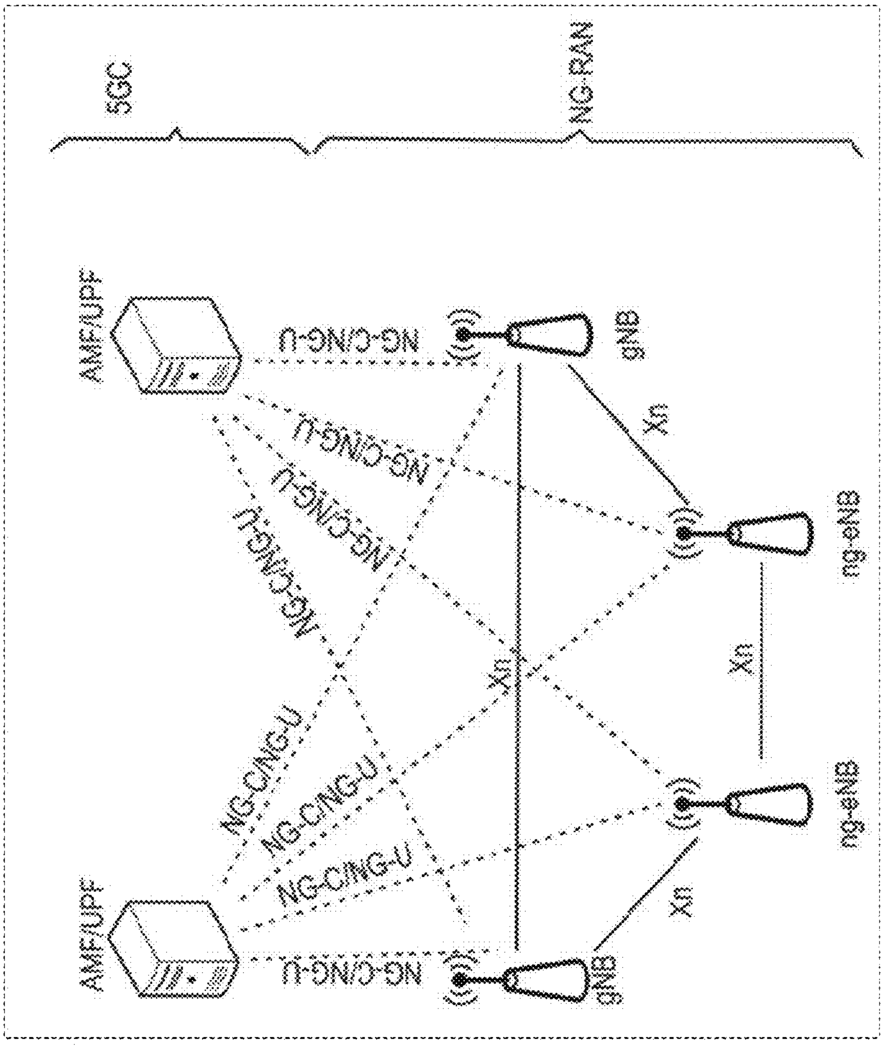
FIG. 14 illustrates an exemplary architecture of a 3GPP NR system.

For example, the overall system architecture assumes an NG-RAN (Next Generation-Radio Access Network) that includes gNBs. The gNB provides the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 14 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing Δf are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split Between NG-RAN and 5GC in 5G NR>

Figure 15:
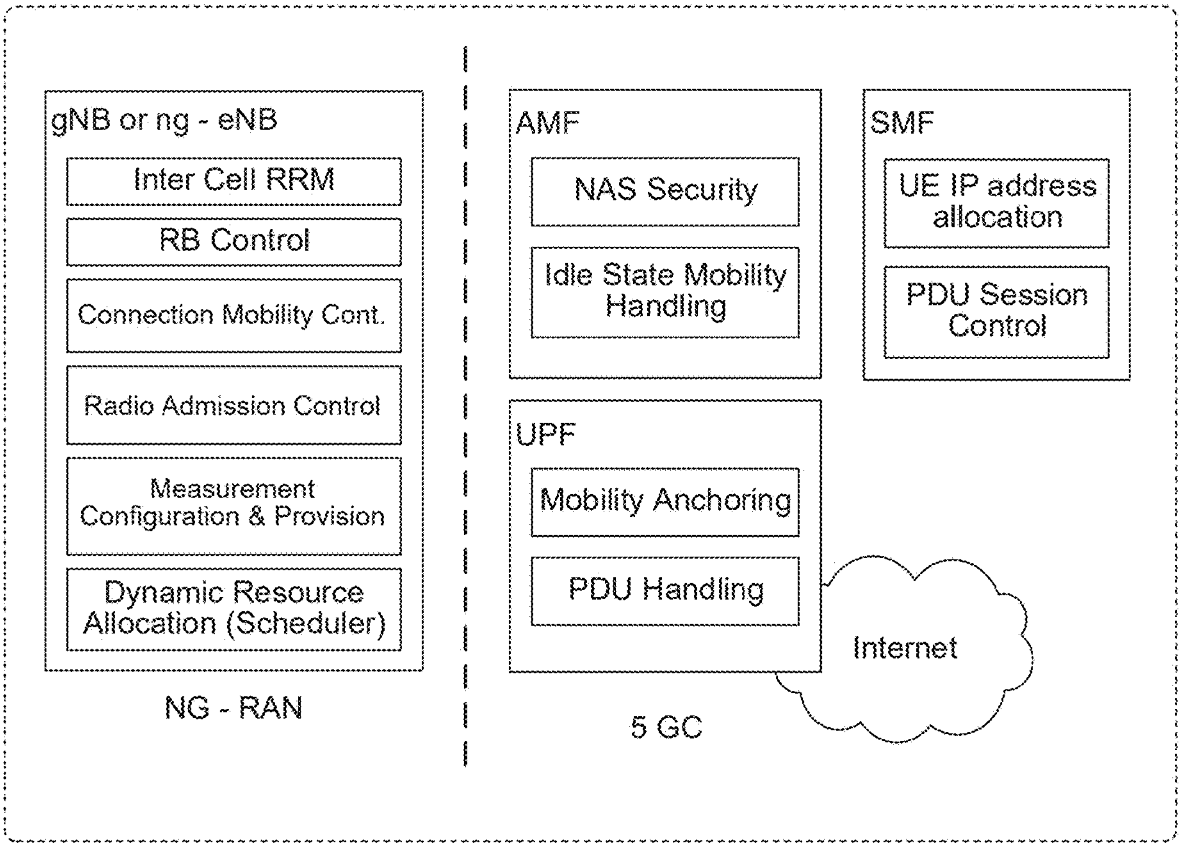
FIG. 15 is a schematic diagram illustrating a functional split between NG-RAN and 5GC.

FIG. 15 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

- Radio Resource Management functions such as Radio Bearer Control, Radio Admission Control, Connection Mobility Control, and dynamic allocation (scheduling) of both uplink and downlink resources to a UE;
- IP header compression, encryption, and integrity protection of data;
- Selection of an AMF during UE attachment in such a case when no routing to an AMF can be determined from the information provided by the UE;
- Routing user plane data towards the UPF;
- Routing control plane information towards the AMF;
- Connection setup and release;
- Scheduling and transmission of paging messages;
- Scheduling and transmission of system broadcast information (originated from the AMF or an action management maintenance function (OAM: Operation, Admission, Maintenance));
- Measurement and measurement reporting configuration for mobility and scheduling;
- Transport level packet marking in the uplink;
- Session management;
- Support of network slicing;
- QoS flow management and mapping to data radio bearers;
- Support of UEs in the RRC_INACTIVE state;
- Distribution function for NAS messages;
- Radio access network sharing;
- Dual connectivity; and
- Tight interworking between NR and E-UTRA.

The Access and Mobility Management Function (AMF) hosts the following main functions:

- Function of Non-Access Stratum (NAS) signaling termination;
- NAS signaling security;
- Access Stratum (AS) security control;
- Inter-Core Network (CN) node signaling for mobility between 3GPP access networks;
- Idle mode UE reachability (including control and execution of paging retransmission);
- Registration area management;
- Support of intra-system and inter-system mobility;
- Access authentication;
- Access authorization including check of roaming rights;
- Mobility management control (subscription and policies);
- Support of network slicing;
- Session Management Function (SMF) selection.

In addition, the User Plane Function (UPF) hosts the following main functions:

- Anchor Point for intra-/inter-RAT mobility (when applicable);
- External Protocol Data Unit (PDU) session point for interconnection to a data network;
- Packet routing and forwarding;
- Packet inspection and a user plane part of Policy rule enforcement;
- Traffic usage reporting;
- Uplink classifier to support routing traffic flows to a data network;
- Branching point to support multi-homed PDU session;
- QoS handling for user plane (e.g., packet filtering, gating, UL/DL rate enforcement);
- Uplink traffic verification (SDF to QoS flow mapping); and
- Function of downlink packet buffering and downlink data notification triggering.

Finally, the Session Management Function (SMF) hosts the following main functions:

- Session management;
- UE IP address allocation and management;
- Selection and control of UPF;
- Configuration function for traffic steering at the User Plane Function (UPF) to route traffic to a proper destination;
- Control part of policy enforcement and QoS; and
- Downlink data notification.

<RRC Connection Setup and Reconfiguration Procedure>

Figure 16:
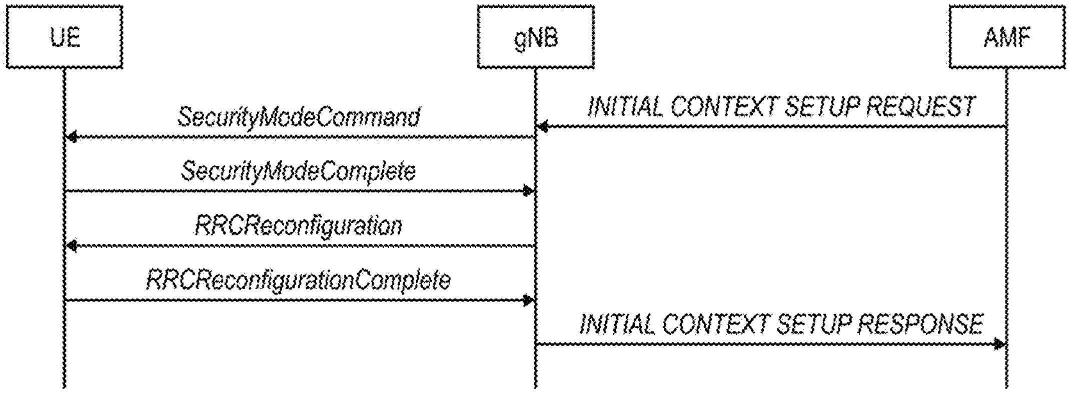
FIG. 16 is a sequence diagram of an RRC connection setup/reconfiguration procedure.

FIG. 16 illustrates some interactions between a UE, gNB, and AMF (a 5GC Entity) performed in the context of a transition of the UE from RRC_IDLE to RRC_CONNECTED for the NAS part (see TS 38 300 v 15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer (s), DRB (s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is configured up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 17:
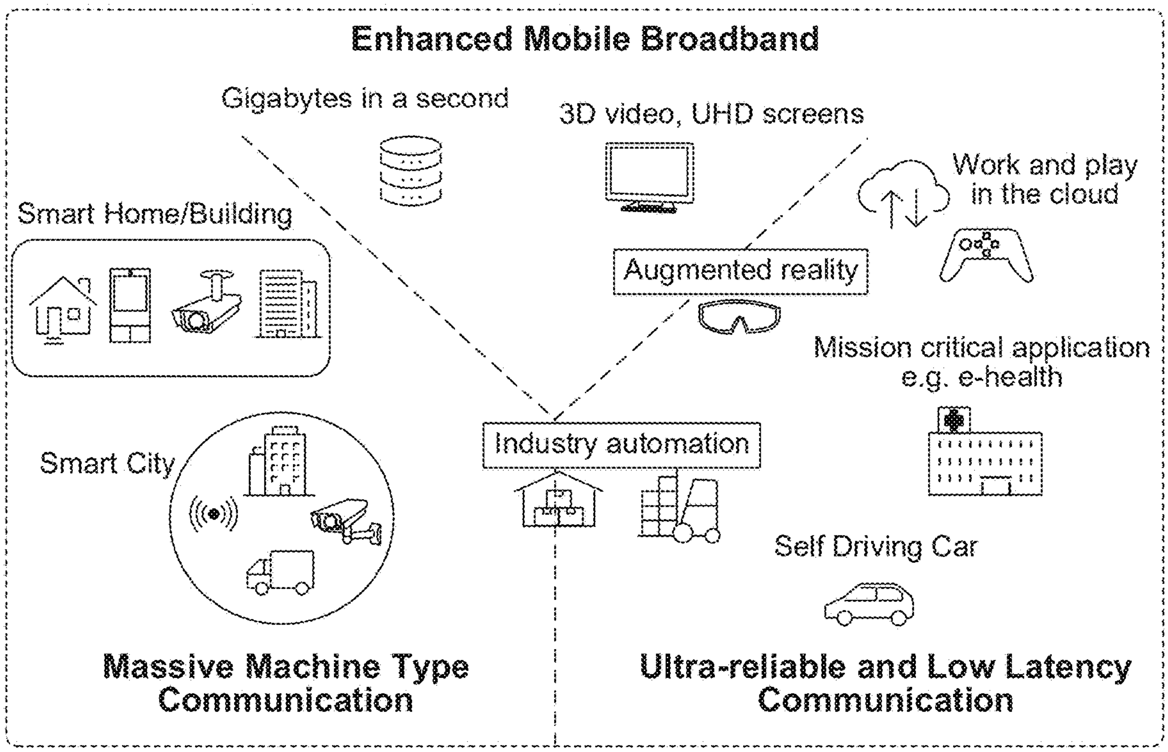
FIG. 17 schematically illustrates usage scenarios of enhanced Mobile BroadBand (eMBB), massive Machine Type Communications (mMTC), and Ultra Reliable and Low Latency Communications (URLLC)

FIG. 17 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 17 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements configured by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 16. Further, additional DRB (s) for QoS flow (s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 18:
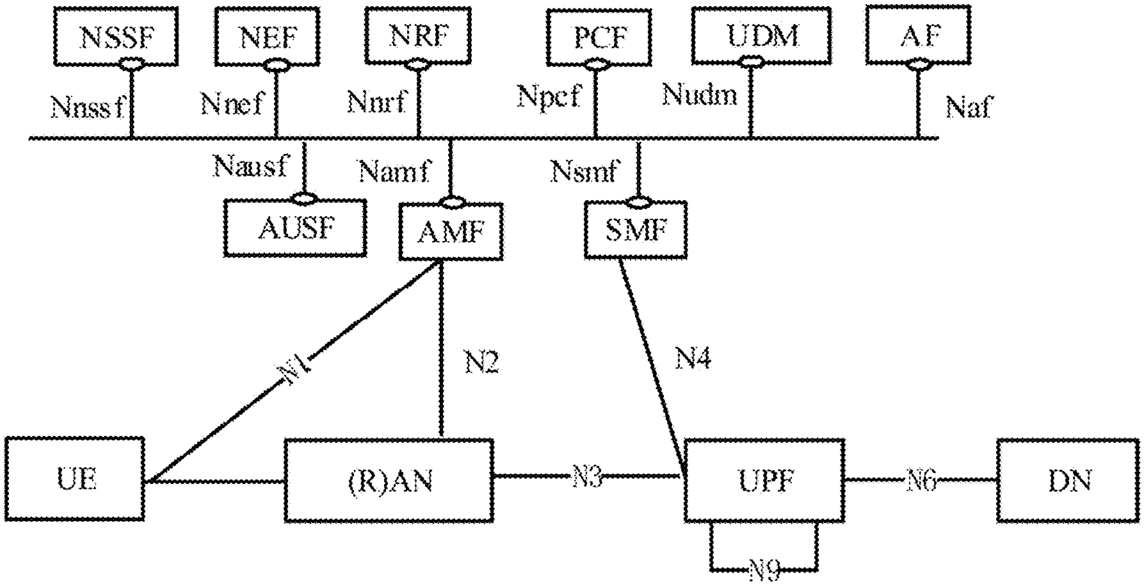
FIG. 18 is a block diagram illustrating an exemplary 5G system architecture for a non-roaming scenario.

FIG. 18 illustrates a 50 NR non-roaming reference architecture (see TS 23.501 v16.1.0, section 4.23). An Application Function (AF), e.g., an external application server hosting 5G services, exemplarily described in FIG. 17, interacts with the 3GPP Core Network in order to provide services, e.g., to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 18 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (e.g., NEF, AMF, SMF, PCF, UPF, etc.) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an embodiment of the present disclosure includes: control circuitry, which, in operation, performs control of an uplink transmission timing by using either a first offset or a second offset that is shorter than the first offset, based on information on a control signal for scheduling; and transmission circuitry, which, in operation, performs uplink transmission based on the control of the uplink transmission timing.

In the embodiment of the present disclosure, the information indicates a format of the control signal, and the control circuitry uses the first offset when the format is DCI format 0_0 or DC format 1_1.

In the embodiment of the present disclosure, the information indicates a search space used for transmission of the control signal, and the control circuitry uses the first offset when the search space is a search space common to a plurality of terminals.

In the embodiment of the present disclosure, the information indicates a resource used for transmission of the control signal, and the control circuitry uses the first offset when the resource is a resource common to a plurality of terminals.

In the embodiment of the present disclosure, the information indicates a scheduling method by the control signal, and the control circuitry uses the first offset when the scheduling method is semi-persistent scheduling.

In the embodiment of the present disclosure, the information indicates a re-transmission process number notified by the control signal, and the control circuitry selects either the first offset or the second offset in accordance with the re-transmission process number.

In the embodiment of the present disclosure, the control circuitry selects the first offset when the re-transmission process number is zero.

In the embodiment of the present disclosure, reception circuitry, which, in operation, receives information on the second offset by a re-transmission process in which re-transmission control is enabled.

In the embodiment of the present disclosure, reception circuitry, which, in operation, receives information on the second offset by a re-transmission process in which re-transmission control is disabled.

A base station according to the embodiment of the present disclosure includes: control circuitry, which, in operation, performs control of an uplink reception timing by using either a first offset or a second offset that is shorter than the first offset, based on information on a control signal for scheduling; and transmission circuitry, which, in operation, performs uplink reception based on the control of the uplink reception timing.

In a transmission method according to the embodiment of the present disclosure, a terminal performs control of an uplink transmission timing by using either a first offset or a second offset that is shorter than the first offset, based on information on a control signal for scheduling, and performs uplink transmission based on the control of the uplink transmission timing.

In a reception method according to the embodiment of the present disclosure, a base station performs control of an uplink reception timing by using either a first offset or a second offset that is shorter than the first offset, based on information on a control signal for scheduling, and performs uplink reception based on the control of the uplink reception timing.

The disclosure of Japanese Patent Application No. 2020-177279, filed on Oct. 22, 2020, including the specification, drawings and abstract, is incorporated herein by reference in its entirety.

INDUSTRIAL APPLICABILITY

One aspect of the present disclosure is useful in a radio communication system.

REFERENCE SIGNS LIST

100 Terminal
101 PRACH generator
102, 206 Data generator
103 Position information acquirer
104 Timing adjustor
105, 208 Radio transmitter
106, 201 Antenna
107, 202 Radio receiver
108 Demodulator/decoder
109, 209 Controller
200 Base station
203 Data reception processor
204 PRACH detector
205 Timing control information generator
207 Data transmission processor

The invention claimed is:

1. A terminal comprising;

control circuit, which, in operation, controls an uplink transmission timing by using one of a first offset and a second offset, based on information relating to a control signal used for scheduling; and a transmitter, which, in operation, performs an uplink transmission based on the uplink transmission timing, wherein the first offset is a cell specific offset, and the second offset is an offset based on the cell specific offset and a terminal specific offset, the information relating to the control signal is information on downlink control information (DCI) in a first DCI format with a first Radio Network Temporary Identifier (RNTI), and the control circuit, under a first condition, controls the uplink transmission timing by using the first offset, and, under a second condition different from the first condition, controls the uplink transmission timing by using the second offset, wherein, both under the first condition and the second condition, the DCI is in the first DCI format with the first RNTI.

2. The terminal according to claim 1, wherein the first condition is met in a case of an uplink transmission scheduled by an UL grant of Random Access (RA) response.

3. The terminal according to claim 1, wherein the information relating to the control signal is information on the DCI relating to a downlink data transmission, and the uplink transmission timing is a transmission timing of a response signal to the downlink data transmission.

4. The terminal according to claim 1, wherein the first condition is met when a first type of Search Space is used for scheduling; and the second condition is met when a second type of Search Space different from the first type is used for scheduling.

5. The terminal according to claim 1, wherein the first condition is met when a first resource for control channel transmission is used for scheduling; and the second condition is met when a second resource for control channel transmission different from the first resource is used for scheduling.

6. The terminal according to claim 1, wherein the first condition is met when a first Hybrid Automatic Repeat Request (HARQ) process is used; and the second condition is met when a second HARQ process different from the first HARQ process is used.

7. A transmission method comprising;

controlling an uplink transmission timing by using one of a first offset and a second offset, based on information relating to a control signal used for scheduling;

transmitting an uplink transmission based on the uplink transmission timing, wherein the first offset is a cell specific offset, and the second offset is an offset based on the cell specific offset and a terminal specific offset, the information relating to the control signal is information on downlink control information (DCI) in a first DCI format with a first Radio Network Temporary Identifier (RNTI), and under a first condition, controlling the uplink transmission timing, and, under a second condition different from the second condition, controlling the uplink transmission timing by using the second offset, wherein, both under the first condition and the second condition, the DCI is in the first DCI format with the first RNTI.

8. The transmission method according to claim 7, wherein the first condition is met in a case of an uplink transmission scheduled by an UL grant of Random Access (RA) response.

9. The transmission method according to claim 7, wherein the information relating to the control signal is information on the DCI relating to a downlink data transmission, and the uplink transmission timing is a transmission timing of a response signal to the downlink data transmission.

10. The transmission method according to claim 7, wherein the first condition is met when a first type of Search Space is used for scheduling; and the second condition is met when a second type of Search Space different from the first type is used for scheduling.

11. The transmission method according to claim 7, wherein the first condition is met when a first resource for control channel transmission is used for scheduling; and the second condition is met when a second resource for control channel transmission different from the first resource is used for scheduling.

12. The transmission method according to claim 7, wherein the first condition is met when a first Hybrid Automatic Repeat Request (HARQ) process is used; and the second condition is met when a second HARQ process different from the first HARQ process is used.

* * * * *